(12) United States Patent
Chang et al.

(10) Patent No.: US 11,687,264 B2
(45) Date of Patent: Jun. 27, 2023

(54) TECHNOLOGIES FOR ACCELERATOR INTERFACE

(71) Applicant: Intel Corporation, Santa Clara, CA (US)

(72) Inventors: Chih-Jen Chang, Union City, CA (US); Brad Burres, Waltham, MA (US); Jose Niell, Franklin, MA (US); Dan Biederman, Saratoga, CA (US); Robert Cone, Portland, OR (US); Pat Wang, San Jose, CA (US); Kenneth Keels, Austin, TX (US); Patrick Fleming, Portlaoise (IE)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 15/721,053

(22) Filed: Sep. 29, 2017

(65) Prior Publication Data
US 2018/0152317 A1    May 31, 2018

Related U.S. Application Data

(60) Provisional application No. 62/427,268, filed on Nov. 29, 2016.

(30) Foreign Application Priority Data

Aug. 30, 2017    (IN) .............................. 201741030632

(51) Int. Cl.
*H04L 67/63* (2022.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
None
See application file for complete search history.

(56) References Cited

U.S. PATENT DOCUMENTS

| | | | |
|---|---|---|---|
| 10,515,037 B2 * | 12/2019 | Pope | ...................... G06F 13/362 |
| 2012/0099591 A1 * | 4/2012 | Kotha | ...................... H04L 45/54 |
| | | | 370/392 |

(Continued)

OTHER PUBLICATIONS

Adrian M. Caulfield et al., "A Cloud-Scale Acceleration Architecture," Microsoft Corporation, retrieved from https://www.microsoft.com/en-US/research/wp-content/uploads/2016/10/Cloud-Scale-Acceleration-Architecture.pdf, 13 pages.

(Continued)

*Primary Examiner* — Faiyazkhan Ghafoerkhan
(74) *Attorney, Agent, or Firm* — Compass IP Law PC

(57) ABSTRACT

Technologies for an accelerator interface over Ethernet are disclosed. In the illustrative embodiment, a network interface controller of a compute device may receive a data packet. If the network interface controller determines that the data packet should be pre-processed (e.g., decrypted) with a remote accelerator device, the network interface controller may encapsulate the data packet in an encapsulating network packet and send the encapsulating network packet to a remote accelerator device on a remote compute device. The remote accelerator device may pre-process the data packet (e.g., decrypt the data packet) and send it back to the network interface controller. The network interface controller may then send the pre-processed packet to a processor of the compute device.

27 Claims, 19 Drawing Sheets

(51) Int. Cl.

| | | |
|---|---|---|
| G06F 16/174 | (2019.01) | |
| G06F 21/57 | (2013.01) | |
| G06F 21/73 | (2013.01) | |
| G06F 8/65 | (2018.01) | |
| H04L 41/0816 | (2022.01) | |
| H04L 41/0853 | (2022.01) | |
| H04L 41/12 | (2022.01) | |
| H04L 67/10 | (2022.01) | |
| G06F 11/30 | (2006.01) | |
| G06F 9/50 | (2006.01) | |
| H01R 13/453 | (2006.01) | |
| G06F 9/48 | (2006.01) | |
| G06F 9/455 | (2018.01) | |
| H05K 7/14 | (2006.01) | |
| H04L 61/5007 | (2022.01) | |
| H04L 67/75 | (2022.01) | |
| H03M 7/30 | (2006.01) | |
| H03M 7/40 | (2006.01) | |
| H04L 43/08 | (2022.01) | |
| H04L 47/20 | (2022.01) | |
| H04L 47/2441 | (2022.01) | |
| G06F 11/07 | (2006.01) | |
| G06F 11/34 | (2006.01) | |
| G06F 7/06 | (2006.01) | |
| G06T 9/00 | (2006.01) | |
| H03M 7/42 | (2006.01) | |
| H04L 12/28 | (2006.01) | |
| H04L 12/46 | (2006.01) | |
| G06F 13/16 | (2006.01) | |
| G06F 21/62 | (2013.01) | |
| G06F 21/76 | (2013.01) | |
| H03K 19/173 | (2006.01) | |
| H04L 9/08 | (2006.01) | |
| H04L 41/044 | (2022.01) | |
| H04L 49/104 | (2022.01) | |
| H04L 43/04 | (2022.01) | |
| H04L 43/06 | (2022.01) | |
| H04L 43/0894 | (2022.01) | |
| G06F 9/38 | (2018.01) | |
| G06F 12/02 | (2006.01) | |
| G06F 12/06 | (2006.01) | |
| G06T 1/20 | (2006.01) | |
| G06T 1/60 | (2006.01) | |
| G06F 9/54 | (2006.01) | |
| H04L 67/1014 | (2022.01) | |
| G06F 8/656 | (2018.01) | |
| G06F 8/658 | (2018.01) | |
| G06F 8/654 | (2018.01) | |
| G06F 9/4401 | (2018.01) | |
| H01R 13/631 | (2006.01) | |
| H04L 47/78 | (2022.01) | |
| G06F 16/28 | (2019.01) | |
| H04Q 11/00 | (2006.01) | |
| G06F 11/14 | (2006.01) | |
| H04L 41/046 | (2022.01) | |
| H04L 41/0896 | (2022.01) | |
| H04L 41/142 | (2022.01) | |
| H04L 9/40 | (2022.01) | |
| G06F 15/80 | (2006.01) | |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/45533* (2013.01); *G06F 9/4843* (2013.01); *G06F 9/4881* (2013.01); *G06F 9/5005* (2013.01); *G06F 9/505* (2013.01); *G06F 9/5038* (2013.01); *G06F 9/5044* (2013.01); *G06F 9/5083* (2013.01); *G06F 9/544* (2013.01); *G06F 11/0709* (2013.01); *G06F 11/079* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/5007* (2022.05); *H04L 67/10* (2013.01); *H04L 67/1014* (2013.01); *H04L 67/63* (2022.05); *H04L 67/75* (2022.05); *H05K 7/1452* (2013.01); *H05K 7/1487* (2013.01); *H05K 7/1491* (2013.01); *G06F 11/1453* (2013.01); *G06F 12/023* (2013.01); *G06F 15/80* (2013.01); *G06F 16/285* (2019.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01); *H04Q 11/0005* (2013.01); *H05K 7/1447* (2013.01); *H05K 7/1492* (2013.01)

(56) References Cited

U.S. PATENT DOCUMENTS

| | | | | |
|---|---|---|---|---|
| 2012/0151004 | A1* | 6/2012 | Pope | G06Q 40/04 709/219 |
| 2012/0250686 | A1* | 10/2012 | Vincent | H04L 12/4641 370/392 |
| 2012/0254587 | A1* | 10/2012 | Biran | G06F 13/4022 712/34 |
| 2013/0138758 | A1* | 5/2013 | Cohen | H04L 67/1097 709/212 |
| 2014/0105208 | A1* | 4/2014 | Pope | H04L 12/1804 370/400 |
| 2015/0019748 | A1* | 1/2015 | Gross, IV | H04L 47/36 709/230 |

(56) References Cited

U.S. PATENT DOCUMENTS

| | | | | |
|---|---|---|---|---|
| 2015/0161064 | A1* | 6/2015 | Pope | G06F 13/385 |
| | | | | 710/308 |
| 2015/0169496 | A1* | 6/2015 | Pope | G06F 13/28 |
| | | | | 705/37 |
| 2015/0186268 | A1* | 7/2015 | Asaad | G06F 9/5016 |
| | | | | 711/202 |
| 2016/0224268 | A1* | 8/2016 | Asaad | G06F 9/5016 |
| 2016/0330112 | A1* | 11/2016 | Raindel | H04L 63/0428 |
| 2016/0364271 | A1* | 12/2016 | Burger | G06F 9/5044 |
| 2016/0380896 | A1* | 12/2016 | Caulfield | H04L 47/10 |
| | | | | 370/235 |
| 2016/0380922 | A1* | 12/2016 | Gross, IV | H04L 47/31 |
| | | | | 370/392 |
| 2017/0024352 | A1* | 1/2017 | Lavasani | G06F 3/0613 |
| 2017/0250914 | A1* | 8/2017 | Caulfield | H04L 43/026 |
| 2018/0150423 | A1* | 5/2018 | Pope | G06Q 40/04 |
| 2018/0152317 | A1* | 5/2018 | Chang | G06F 8/656 |
| 2018/0191629 | A1* | 7/2018 | Biederman | H04L 69/22 |
| 2019/0042310 | A1* | 2/2019 | Browne | G06F 1/3209 |
| 2019/0052583 | A1* | 2/2019 | Jain | H04L 49/9068 |
| 2019/0140979 | A1* | 5/2019 | Levi | G06F 9/45558 |
| 2019/0207868 | A1* | 7/2019 | Chang | H04L 41/042 |
| 2020/0218684 | A1* | 7/2020 | Sen | G06F 13/4027 |

OTHER PUBLICATIONS

Caulfield, Adrian, et al., "A Cloud-Scale Acceleration Architecture", Microsoft Corporation, 2016 EEE, The 49th Annual IEEE/ACM International Symposium on Microarchitecture, Article No. 7, Taipei, Taiwan—Oct. 15-19, 2016, 13 pages.

Extended European Search Report for Patent Application No. 20152538.3, dated Jul. 6, 2020, 9 pages.

Restriction Requirement for U.S. Appl. No. 16/276,979, dated Mar. 22, 2022, 8 pages.

Tarafdar, Naif, "Building and Using Virtual FPGA Clusters in Data Centers", A thesis submitted in conformity with the requirements for the degree of Masters of Applied Science Graduate Department of Electrical and Computer Engineering University of Toronto, Copyright 2017 by Naif Tarafdar, Jun. 2017, 87 pages.

Tarafdar, Naif, et al., "Enabling Flexible Network FPGA Clusters in a Heterogeneous Cloud Data Center", University of Toronto, Conference Paper, Feb. 2017, 11 pages.

European First Office Action, (EP Exam Report Article 94(3) EPC), for Patent Application No. 20152538.3, dated Jul. 28, 2022, 4 pages.

First Office Action for U.S. Appl. No. 16/276,979, dated Jun. 24, 2022, 11 pages.

* cited by examiner

TECHNOLOGIES FOR ACCELERATOR INTERFACE

CROSS-REFERENCE TO RELATED APPLICATION

The present application claims the benefit of U.S. Provisional Patent Application No. 62/427,268, filed Nov. 29, 2016, and Indian Provisional Patent Application No. 201741030632, filed Aug. 30, 2017.

BACKGROUND

Certain computing tasks may be performed more quickly by a hardware accelerator, such as a field programmable gate array (FPGA), application specific integrated circuit (ASIC), or graphics processing unit (GPU), than by a central processing unit. Compute devices are increasingly employing hardware accelerators in order to perform suitable computing tasks more quickly. In many applications, the accelerators may be locally accessible to a central processing unit using a Peripheral Component Interconnect Express (PCIe) or similar connection.

One drawback with the incorporation of a hardware accelerator into a compute device is that the hardware accelerator may be unused much of the time. Depending on the particular task being performed by the compute device, the hardware accelerator may experience a high level of use some times and a low or no level of use at other times, which may be an inefficient allocation of resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 18 is a simplified flow diagram of at least one embodiment of a method for pre-processing a data packet with an accelerator that may be executed by the accelerator sled of FIG. 12;

DETAILED DESCRIPTION OF THE DRAWINGS

Figure 1:
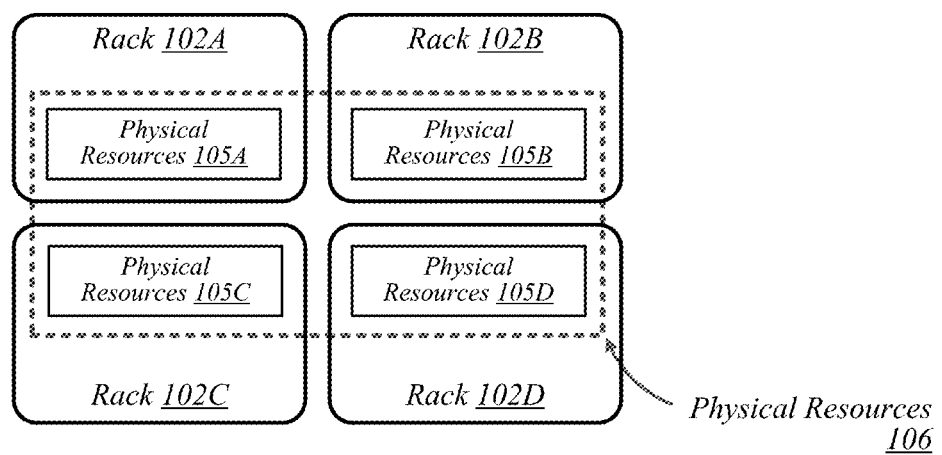
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
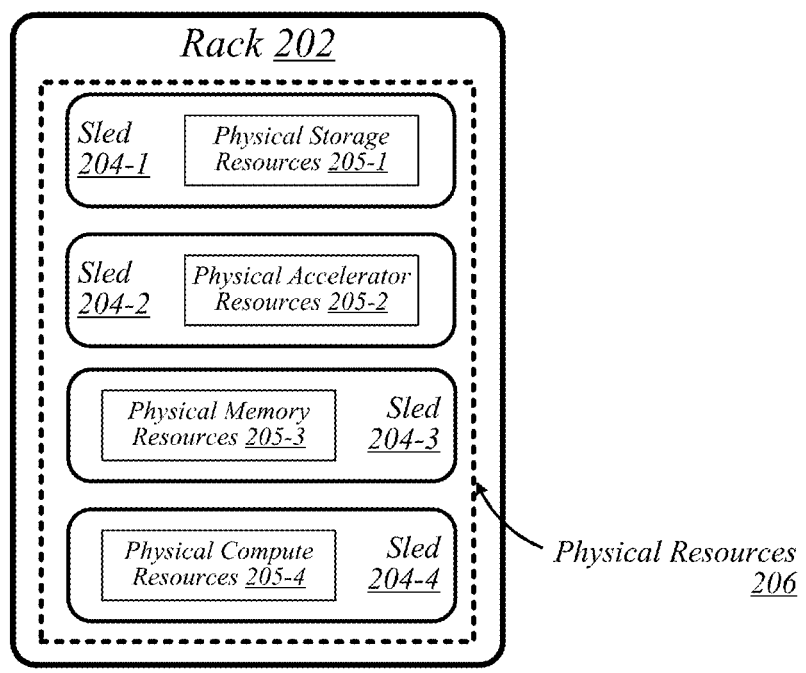
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated/resources, each type of resource can be upgraded independently of each other and at their own optimized refresh rate.

Figure 3:
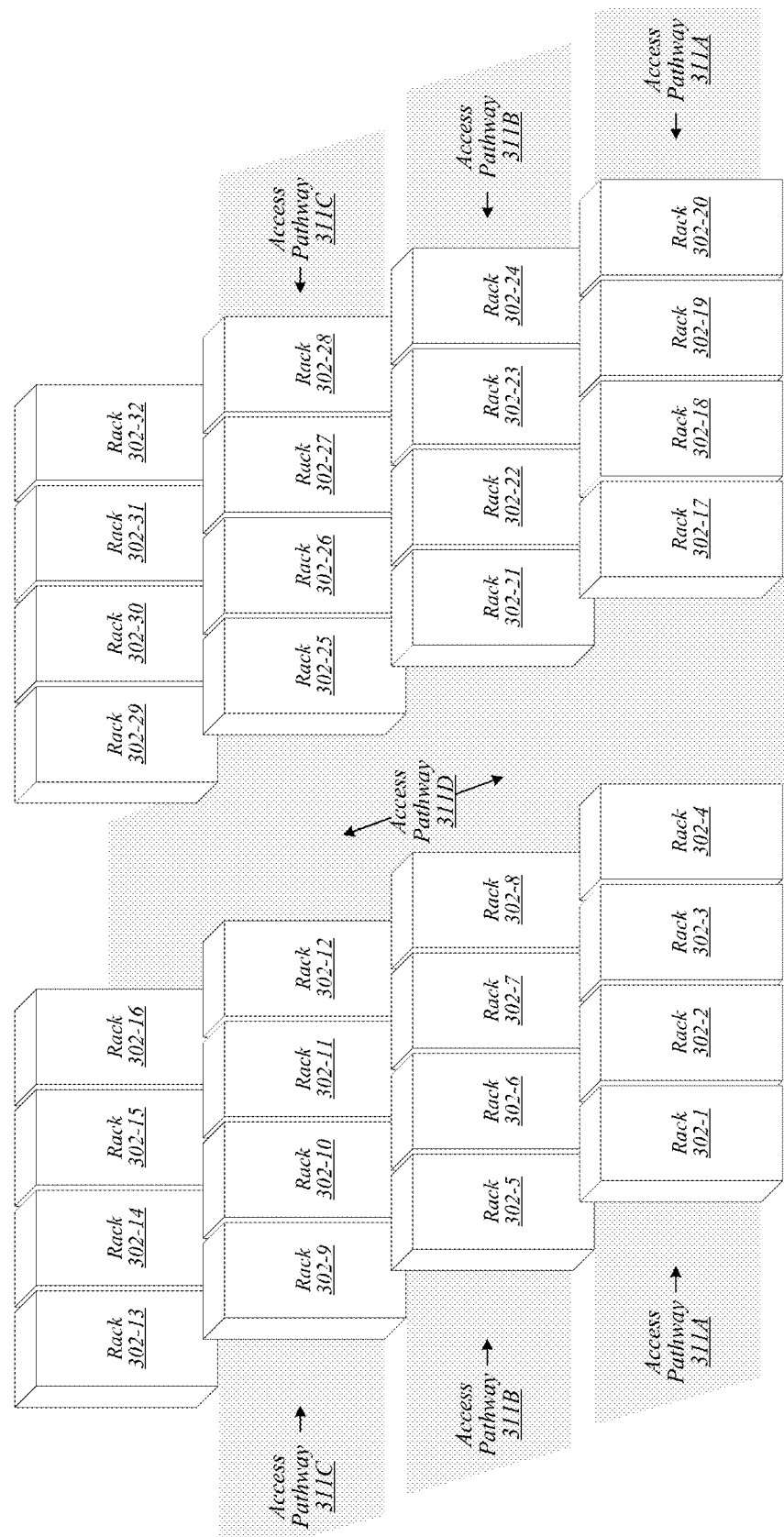
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
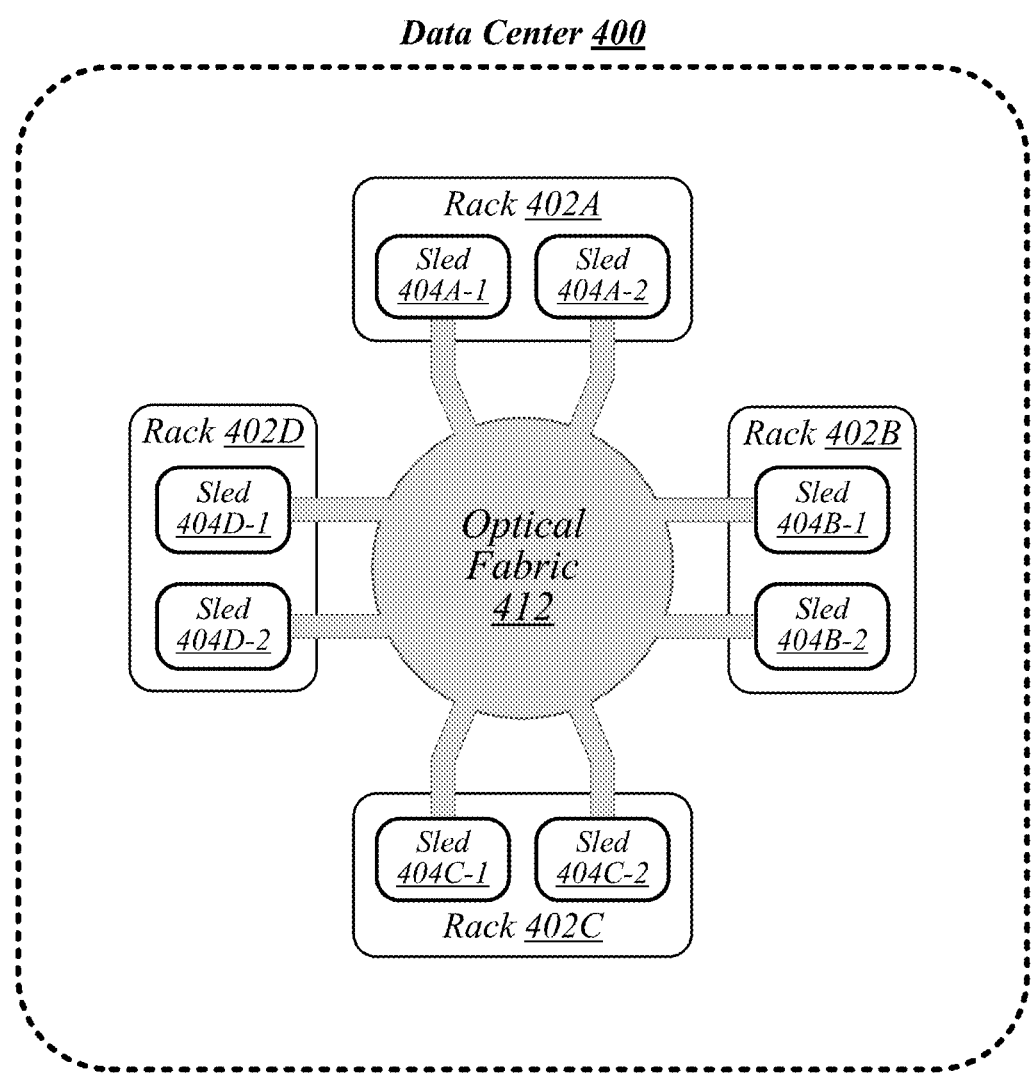
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
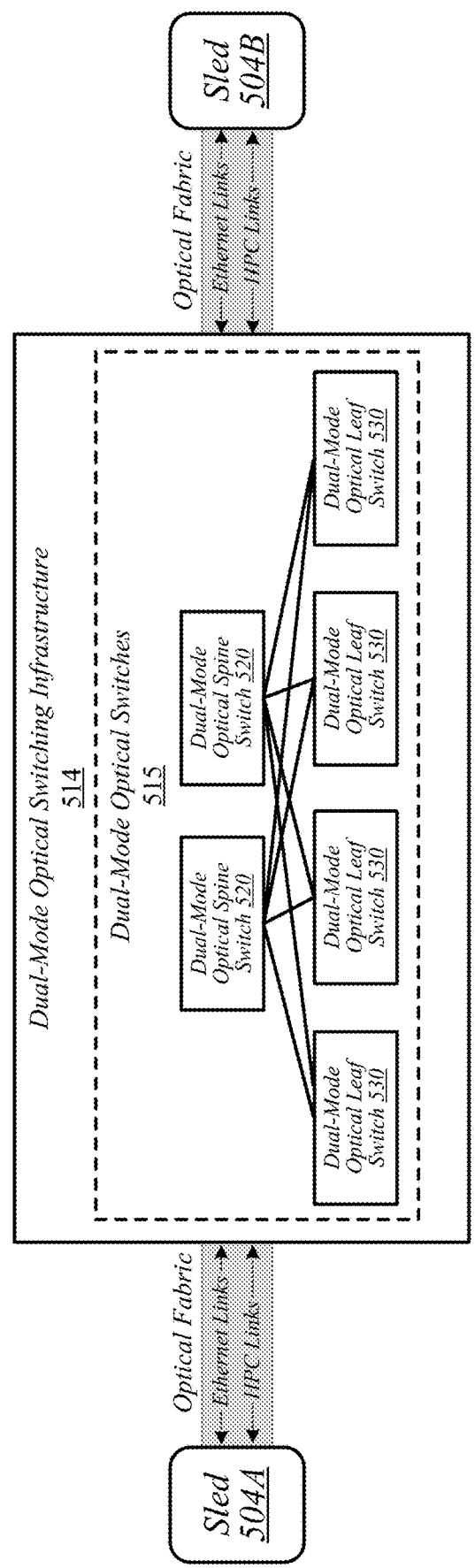
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
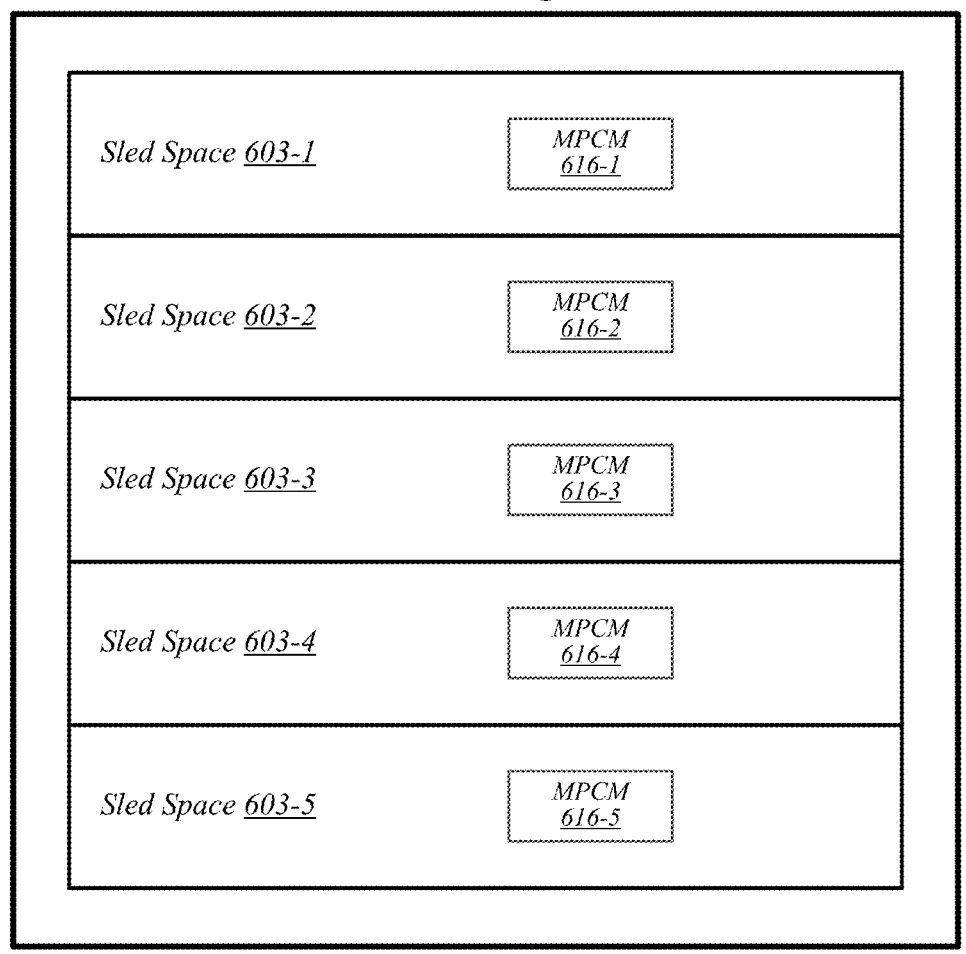
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
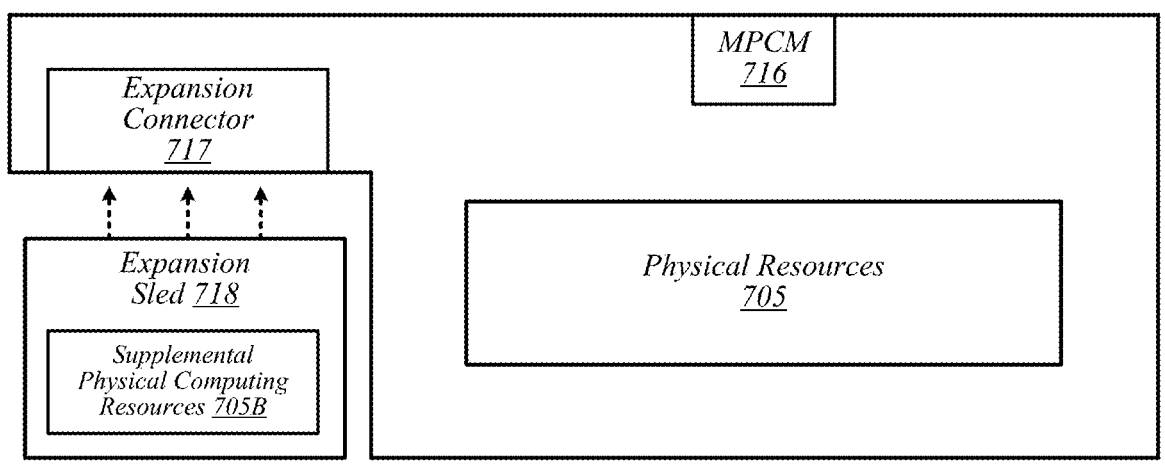
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
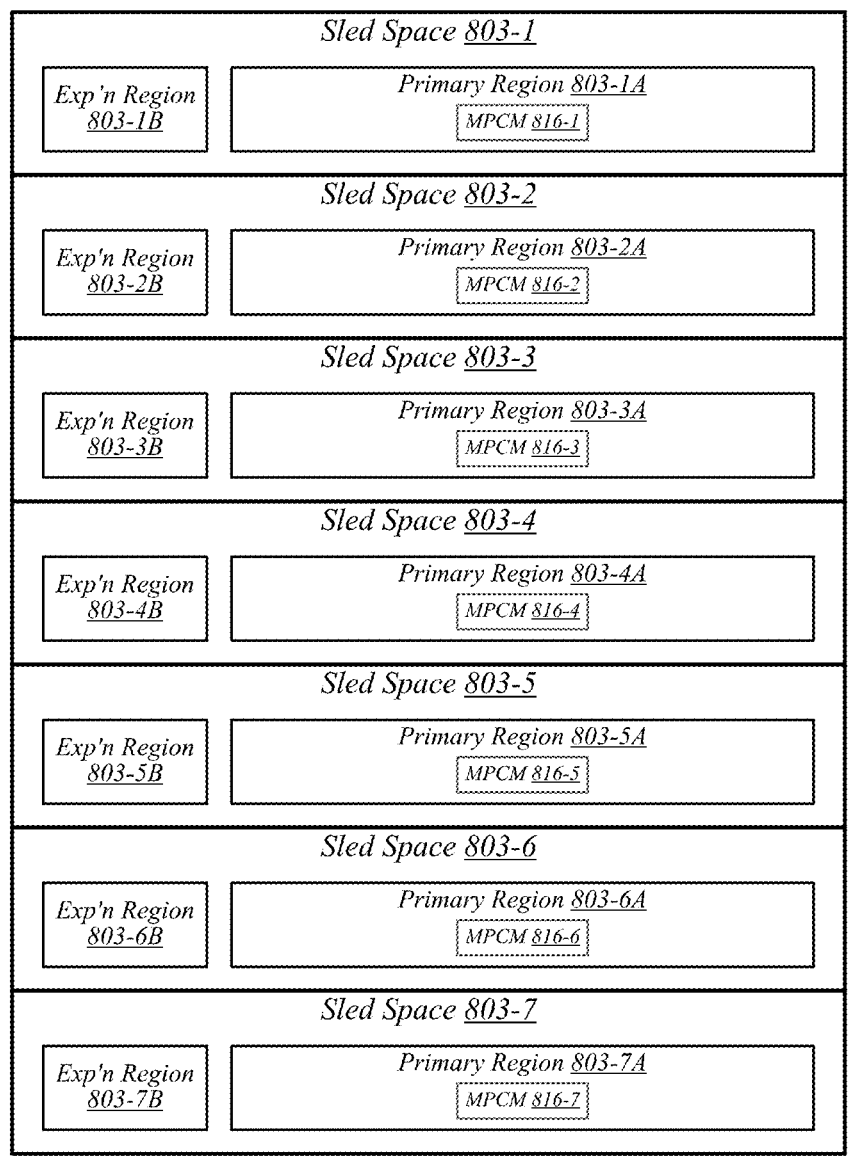
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
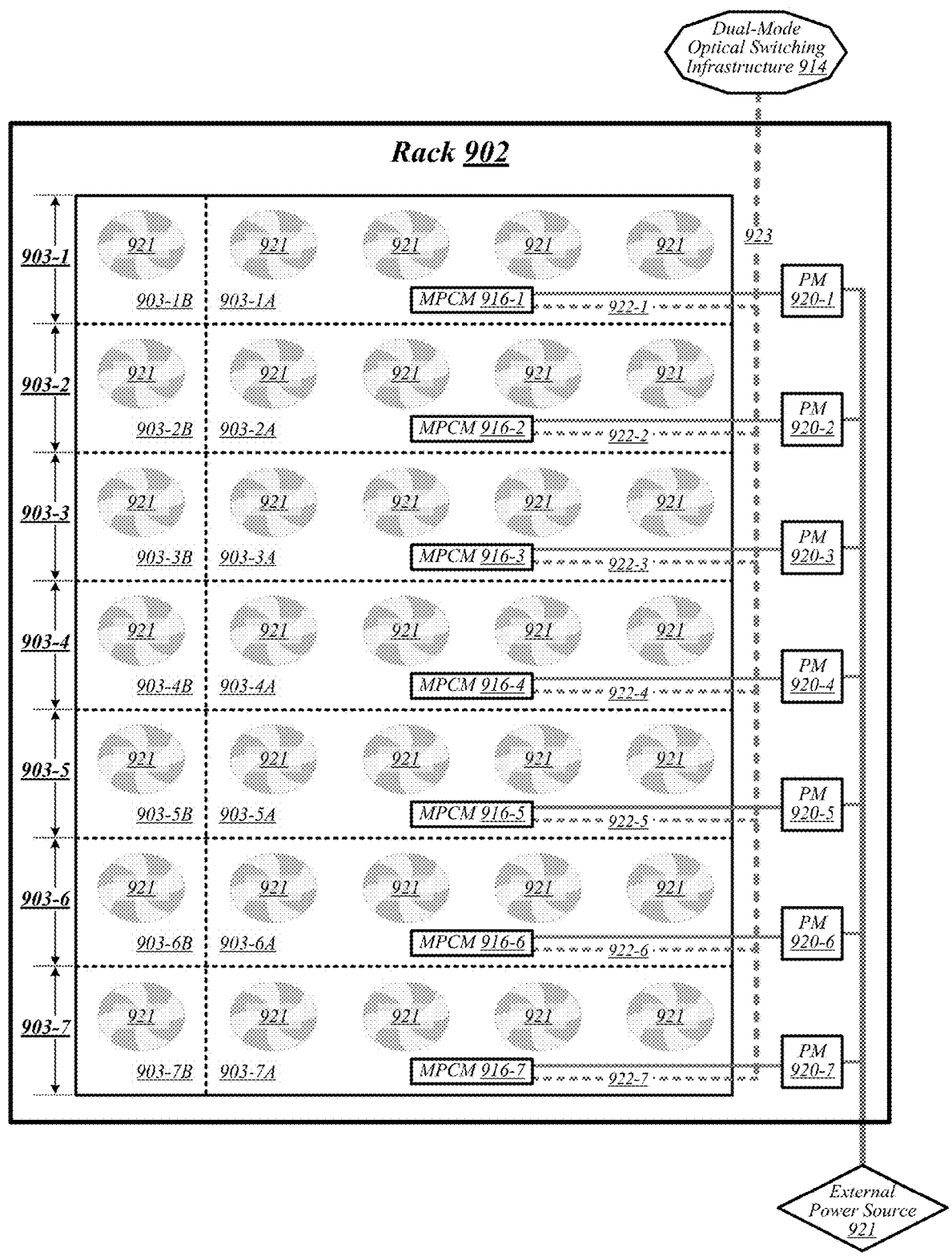
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
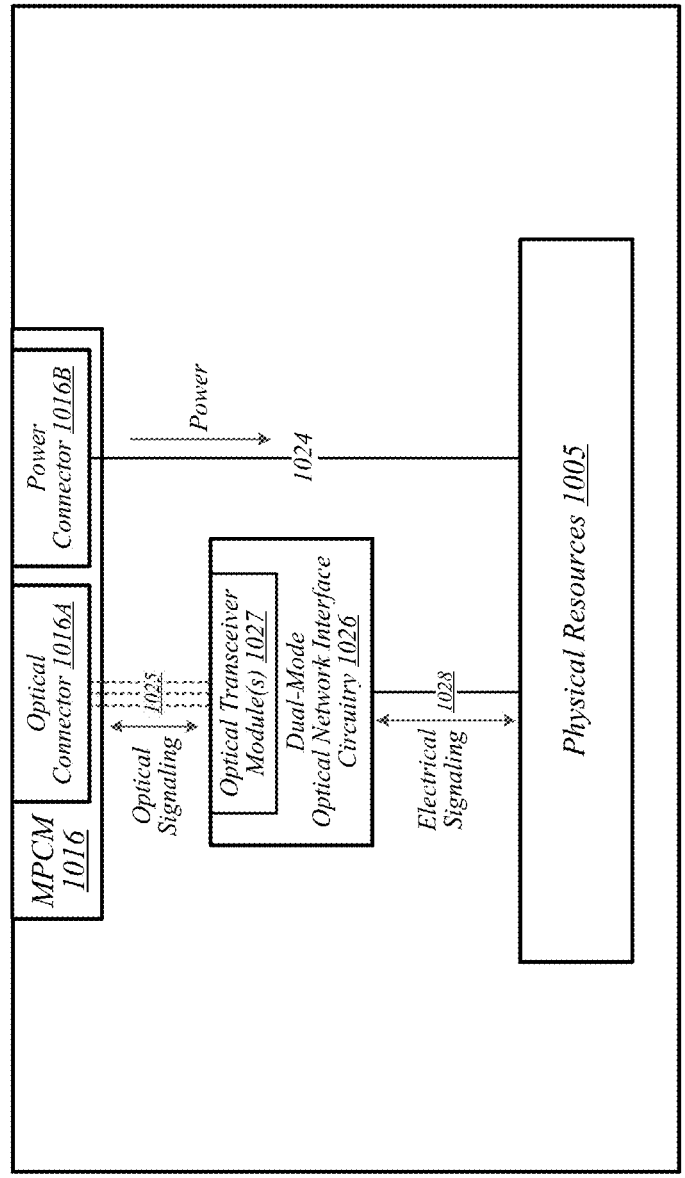
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
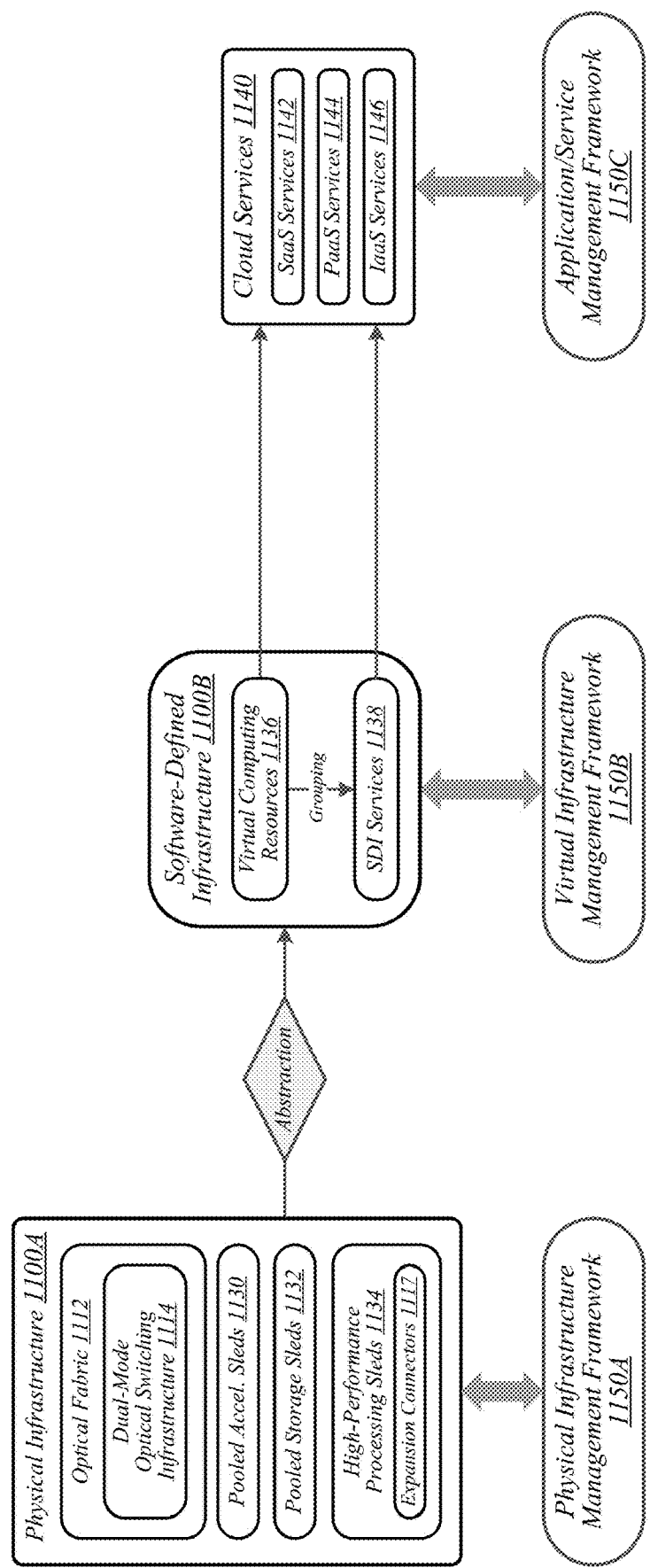
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
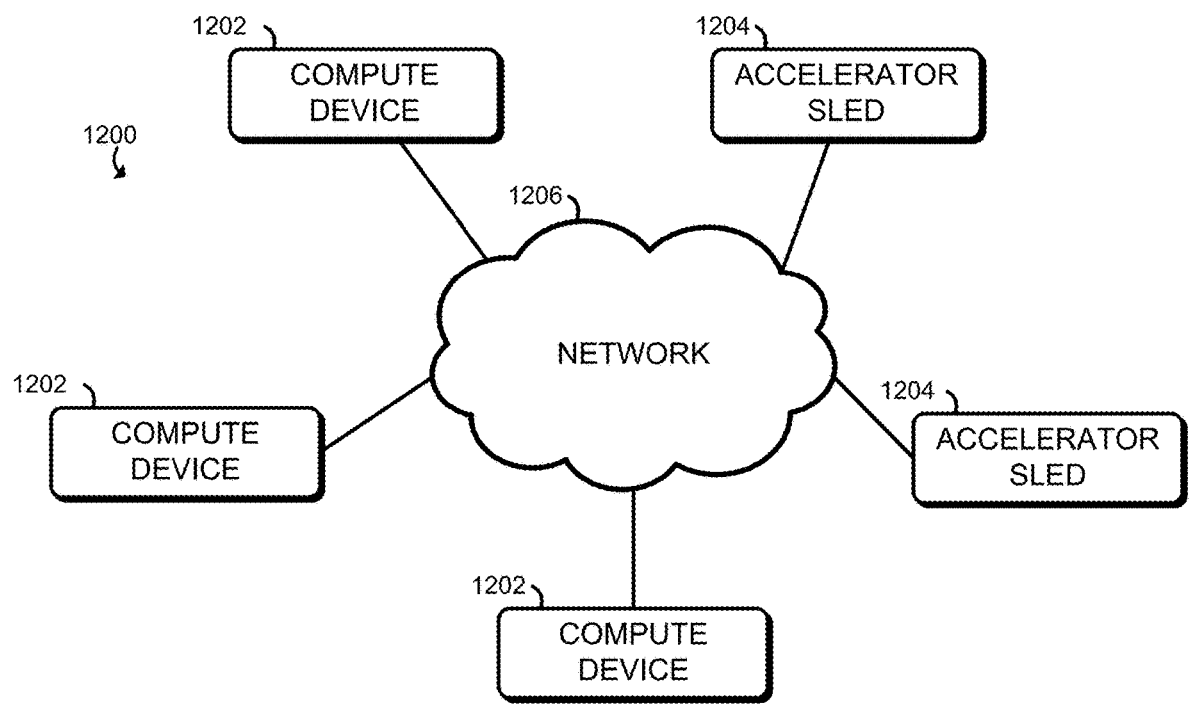
FIG. 12 is a simplified block diagram of at least one embodiment of a network for a remote accelerator interface.

Referring now to FIG. 12, a system 1200 for a remote accelerator interface includes one or more compute devices 1202 and one or more accelerator sleds 1204 which are communicatively connected together by an illustrative network 1206. In the illustrative embodiment, a compute device 1200 may receive a data packet at a network interface controller (NIC) 1310. The compute device 1200 may store the data packet in local memory of the NIC 1310. The compute device 1200 may analyze the packet to determine if pre-processing is required before the data packet is sent from the NIC 1310 to another component of the compute device 1200, such as a processor 1302. For example, the compute device 1200 may determine that the network packet should be decrypted by an accelerator device 1312, that deep packet inspection should be performed on the network packet by an accelerator device 1312, and/or other suitable pre-processing.

The compute device 1200 may use either a local accelerator device 1312 or a remote accelerator device 1408 (which may be on, e.g., an accelerator sled 1204) to pre-process the data packet. If the compute device 1200 uses a local accelerator device 1312, the compute device 1200 may transfer the data packet from the memory of the NIC 1310 to the local accelerator device 1312. The local accelerator device 1312 may then pre-process the data packet (such as by decrypting the data packet) and then send the data packet back to the local memory of the NIC 1310. If the compute device 1200 uses a remote accelerator device 1408 to pre-process the data packet, the compute device 1200 may encapsulate the data packet in a network packet, such as an Ethernet packet, and send the network packet, including the encapsulated data packet, to the remote accelerator device 1408. The encapsulating network packet may include additional information, such as metadata associated with the data packet (e.g., packet flow or pre-parsed details of the data packet), event data describing what functions should be performed on the data packet, encryption keys to use, etc. The remote accelerator device 1408 may then decapsulate the data packet, pre-process the data packet, reencapsulate the data packet, and send the encapsulated data packet back to the NIC 1310, where it will again be loaded into local memory of the NIC 1310. After the data packet has been pre-processed, the compute device 1200 may move the data packet from the local memory of the NIC 1310 to another component of the compute device 1200, such as memory 1304 or the processor 1302.

In addition to encapsulating a data packet to be sent to the remote accelerator device 1408, the NIC 1310 may also encapsulate other commands to be sent to the remote accelerator device 1408, such as a memory transaction, a command, an event, etc. In some embodiments, such transactions may originate from a local accelerator device 1312.

The network 1206 may be embodied as any type of network capable of communicatively connecting the compute devices 1202 and the accelerator sleds 1204. For example, the system 1200 may be embodied as a high performance computing system or a data center, such as a data center 300 shown in FIG. 3, and the network 1206 may be established through a series of cables, switches, and other devices connecting the various compute devices 1202 and accelerator sleds 1204 of the data center, such as the optical fabric 412 shown in FIG. 4. Of course, the network 1206 may be embodied as another type of a network, such as an Internet-of-things fog network, some or all of a telecommunications network, etc.

Figure 13:
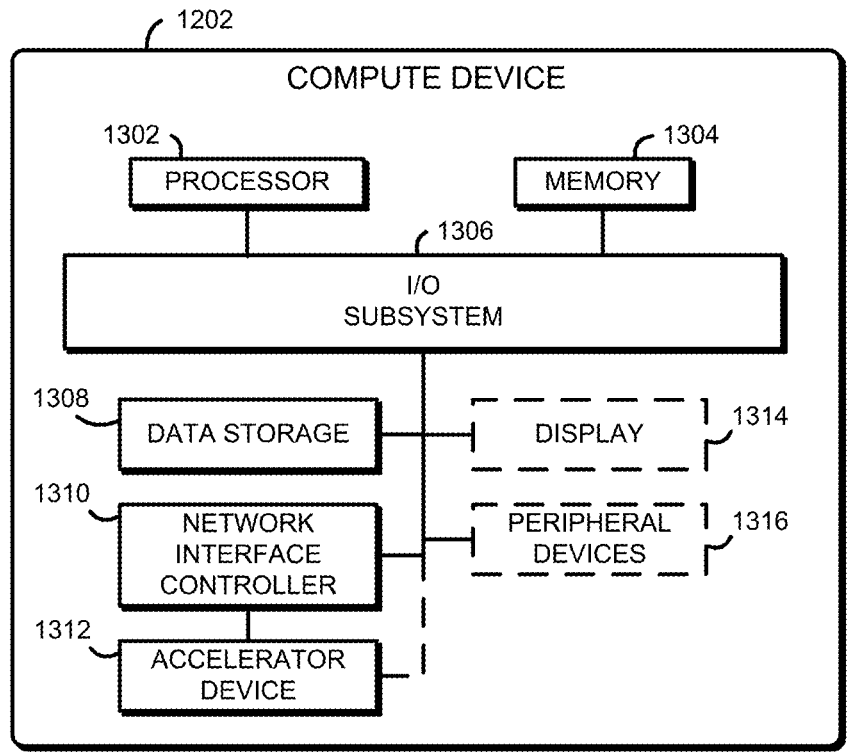
FIG. 13 is a simplified block diagram of at least one embodiment of a compute device of FIG. 12.

Referring now to FIG. 13, an illustrative compute device 1202 of the system 1200 may be embodied as any type of compute device capable of performing the functions described herein. For example, the compute device 1202 may be embodied as or otherwise be included in, without limitation, a server computer, a desktop computer, a sled or blade of a rack, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, a compute device in a mobile backhaul device, a compute device used in a wireless network such as a 5G network, and/or any other computing device. In some embodiments, the compute device 1202 may be embodied as a sled 204 as described above in FIG. 2. Additionally or alternatively, the compute device 1202 may be composed of resources from two or more sleds, such as a sled 204-4 with physical compute resources 205-4 with some or all of a sled 204-1 with physical storage resources 205-1, a sled 204-2 with physical accelerator resources 205-2, and a sled 204-3 with physical memory resources 205-3. In such embodiments, the sled 204-4 with physical compute resources 205-4 may not include any local accelerator devices.

The illustrative compute device 1202 includes the processor 1302, a memory 1304, an input/output (I/O) subsystem 1306, data storage 1308, a network interface controller 1310, and an accelerator device 1312. In some embodiments, one or more of the illustrative components of the compute device 1202 may be incorporated in, or otherwise form a portion of, another component. For example, the memory 1304, or portions thereof, may be incorporated in the processor 1302 in some embodiments.

The processor 1302 may be embodied as any type of processor capable of performing the functions described herein. For example, the processor 1302 may be embodied as a single or multi-core processor(s), a single or multi-socket processor, a digital signal processor, a microcontroller, or other processor or processing/controlling circuit. Similarly, the memory 1304 may be embodied as any type of volatile or non-volatile memory or data storage capable of performing the functions described herein. In operation, the memory 1304 may store various data and software used during operation of the compute device 1202 such as operating systems, applications, programs, libraries, and drivers. The memory 1304 is communicatively coupled to the processor 1302 via the I/O subsystem 1306, which may be embodied as circuitry and/or components to facilitate input/output operations with the processor 1302, the memory 1304, and other components of the compute device 1202. For example, the I/O subsystem 1306 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1306 may form a portion of a system-on-a-chip (SoC) and be incorporated, along with the processor 1302, the memory 1304, and other components of the compute device 1202 on a single integrated circuit chip.

The data storage 1308 may be embodied as any type of device or devices configured for the short-term or long-term storage of data. For example, the data storage 1308 may include any one or more memory devices and circuits, memory cards, hard disk drives, solid-state drives, or other data storage devices. In some embodiments, the data storage 1308 may be embodied as some or all of a sled 204-1 with physical storage resources 205-1.

The network interface controller (NIC) 1310 may be embodied as any type of interface capable of interfacing the compute device 1202 with the network 1206. The NIC 1310 may also be referred to or be embodied as a host fabric interface or network interface card. It should be appreciated that the NIC 1310 need not be embodied as a physical card, but could be embodied as, e.g., all or a portion of a chip or package. The NIC 1310 may be capable of interfacing with any appropriate cable type, such as an electrical cable or an optical cable. The NIC 1310 may be configured to use any one or more communication technology and associated protocols (e.g., Ethernet, Bluetooth®, Wi-Fi®, WiMAX, near field communication (NFC), Omni-Path, Infiniband, etc.). In the illustrative embodiment, the NIC 1310 includes additional electrical components such as a dedicated processor and memory. The illustrative NIC 1310 may include a mesh memory or a fabric memory. The illustrative NIC 1310 may include various agents, which may be discrete hardware, firmware, or software components configured to perform particular tasks related to the functionality of the NIC 1310. Additionally or alternatively, in some embodiments, the NIC 1310 may include a pipeline architecture in which at least some of the functions performed by the NIC 1310 are performed by dedicated hardware devices or subcomponents. Furthermore, in some embodiments, the NIC 1310 may be in a package separate from the processor 1302, in a multi-chip package with the processor 1302, or in a system-on-a-chip with the processor 1302.

The accelerator device 1312 may be embodied as any type of device capable of performing certain computing tasks more quickly or more efficiently relative to the processor 1302. For example, the accelerator device 1312 may be particularly well suited for tasks such as matrix multiplication, implementing a neural network, image processing, etc. The accelerator device 1312 may be embodied as, for example, a field programmable gate array (FPGA), an application specific integrated circuit (ASIC), a graphics processing unit (GPU), etc. The accelerator device 1312 may be connected to other components of the compute device 1202 such as the processor 1302 and the memory 1304 through any suitable connection, such as a PCIe connection, a QuickPath interconnect, a HyperTransport interconnect, etc. In the illustrative embodiment, the accelerator device 1312 has a direct, dedicated connection to the NIC 1310. Additionally or alternatively, in some embodiments, the accelerator device 1312 may be on the same chip as the NIC 1310, in a multi-chip package with the NIC 1310, or in a system-on-a-chip with the NIC 1310. It should be appreciated that, in some embodiments, the compute device 1202 may not include a local accelerator device 1312.

Of course, in some embodiments, the compute device 1202 may include additional components often found in a compute device 1202, such as a display 1314 and/or one or more peripheral devices 1316. The peripheral devices 1316 may include a keyboard, a mouse, a camera, etc. The display 1314 may be embodied as any type of display on which information may be displayed to a user of the compute device 1202, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 14:
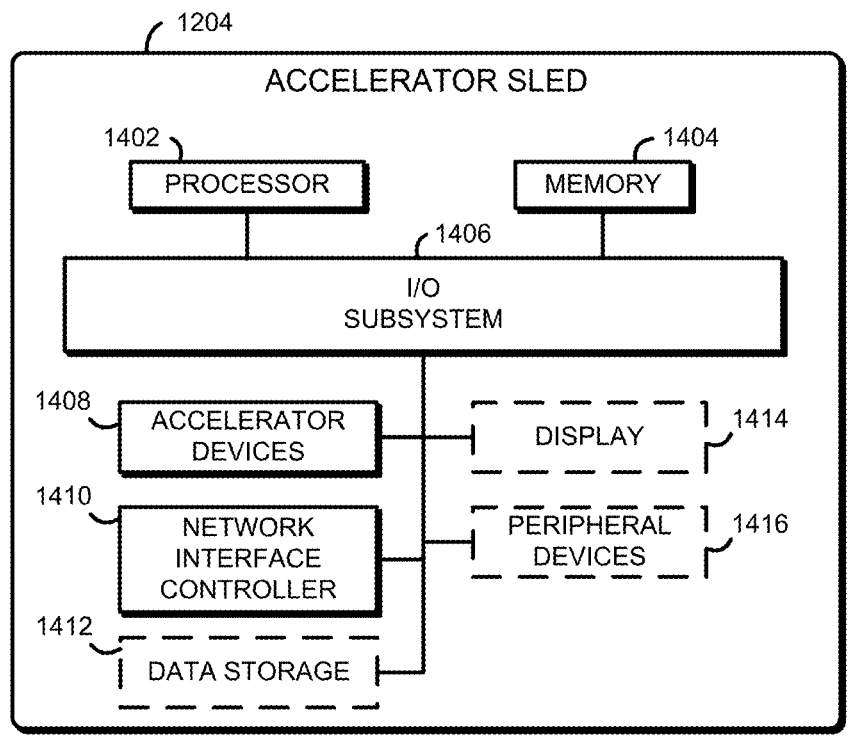
FIG. 14 is a simplified block diagram of at least one embodiment of an accelerator sled of FIG. 12.

Referring now to FIG. 14, an illustrative accelerator sled 1204 of the system 1200 may be embodied as any type of compute device capable of performing the functions described herein. In the illustrative embodiment, the accelerator sled 1204 is embodied as a sled or blade of a rack in a data center. In such an embodiment, the accelerator sled 1204 may be composed of resources from two or more sleds, such as a sled 204-4 with physical compute resources 205-4 with some or all of a sled 204-1 with physical storage resources 205-1, a sled 204-2 with physical accelerator resources 205-2, and a sled 204-3 with physical memory resources 205-3. Additionally or alternative, the accelerator sled 1204 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device. In some embodiments, the accelerator sled 1204 may be embodied as a sled 204 as described above in FIG. 2.

The illustrative accelerator sled 1204 includes a processor 1402, a memory 1404, an I/O subsystem 1406, one or more accelerator devices 1408, a network interface controller 1410, data storage 1412, an optional display 1414, and optional peripheral devices 1416. Each of the processor 1402, the memory 1404, the I/O subsystem 1406, the one or more accelerator devices 1408, the network interface controller 1410, the data storage 1412, the optional display 1414, and the optional peripheral devices 1416 may be similar to the corresponding components of the compute device 1202. As such, the description of those components of the compute device 1202 is equally applicable to the description of those components of the accelerator sled 1204 and is not repeated herein in the interest of clarity of the description. However, it should be appreciated that, in some embodiments, the architecture or configuration of the accelerator sled 1204 may be significantly different from the architecture or configuration of the compute sled 1202. For example, the accelerator sled 1204 may have a processor 1402 that is relatively slow as compared to the processor 1302, and/or the accelerator sled 1204 may include several accelerator devices 1408 that are relatively powerful and/or numerous as compared to the accelerator device 1312 of the compute device 1202.

Figure 15:
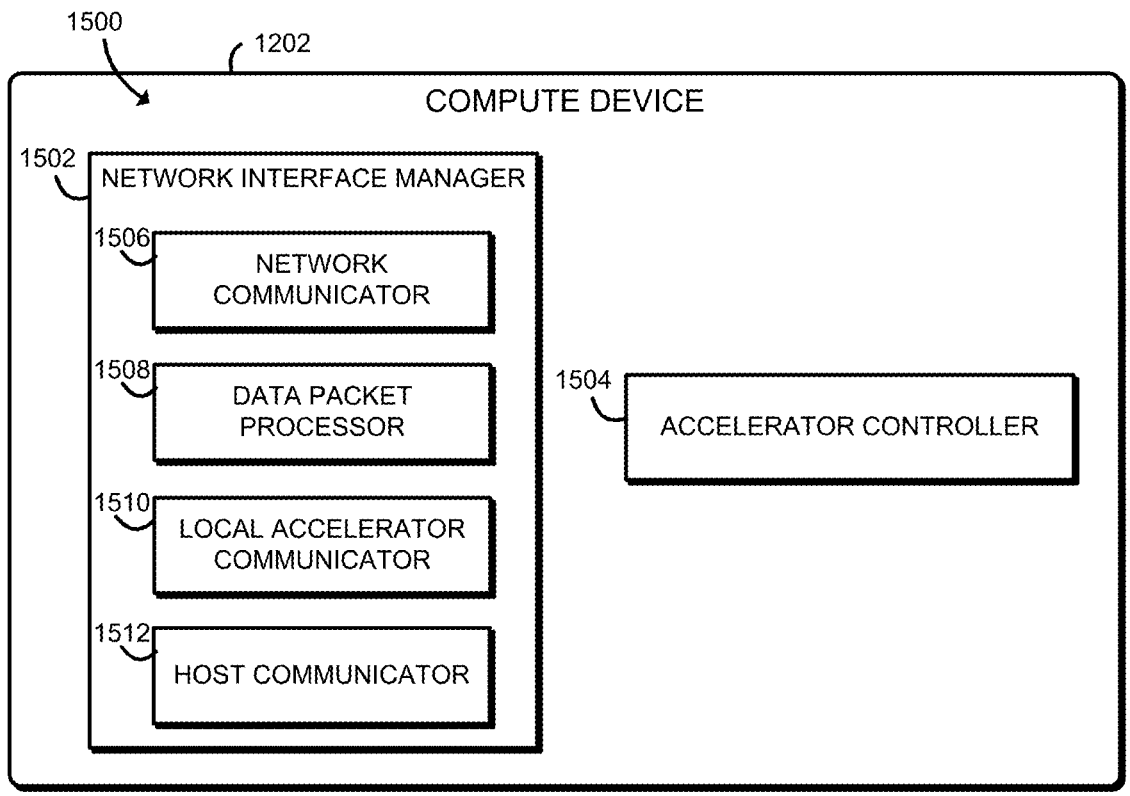
FIG. 15 is a block diagram of at least one embodiment of an environment that may be established by the compute device of FIG. 12.

Referring now to FIG. 15, in use, the compute device 1202 may establish an environment 1500. The illustrative environment 1500 includes a network interface manager 1502 and an accelerator controller 1504. The various components of the environment 1500 may be embodied as hardware, firmware, software, or a combination thereof. As such, in some embodiments, one or more of the components of the environment 1500 may be embodied as circuitry or collection of electrical devices (e.g., a network interface manager circuit 1502, an accelerator controller circuit 1504, etc.). It should be appreciated that, in such embodiments the network interface manager circuit 1502, the accelerator controller circuit 1504, etc., may form a portion of one or more of the processor 1302, the I/O subsystem 1306, the network interface controller 1310, and/or other components of the compute device 1202. Additionally, in some embodiments, one or more of the illustrative components may form a portion of another component and/or one or more of the illustrative components may be independent of one another. Further, in some embodiments, one or more of the components of the environment 1500 may be embodied as virtualized hardware components or emulated architecture, which may be established and maintained by the processor 1302 or other components of the compute device 1202.

The network interface manager 1502 is configured to control the network interface controller 1310. The network interface manager 1502 includes a network communicator 1506, a data packet processor 1508, a local accelerator communicator 1510, and a host communicator 1512. The network communicator 1506 is configured to send and receive packets and/or other messages to and from the network 1206. The network communicator 1506 may send packages or other messages from the memory of the network interface controller 1310 and may receive packages or other messages from the network 1206 to the memory of the network interface controller 1310. The network communicator 1506 may directly control the physical interface to the network 1206, such as an electrical cable or an optical cable.

The data packet processor 1508 is configured to process, manage, and control packets and other messages that are to be sent or have been received by the network interface controller 1310. The data packet processor 1508 may analyze incoming packets and message in order to determine what action should be taken. The data packet processor 1508 may consider any suitable factor or parameter in determining what action should be taken with respect to any given packet, such as packet headers, packet type, packet payload, metadata relating to the packet, etc. In the illustrative embodiment, the data packet processor 1508 analyzes whether an incoming data packet should be pre-processed by an accelerator device. For example, the data packet processor 1508 may determine that a data packet is encrypted, and the data packet should be decrypted by an accelerator device. If the data packet processor 1508 determines that the data packet should be pre-processed, the data packet processor 1508 may then determine whether the data packet should be pre-processed using a local accelerator device 1312 or a remote accelerator device 1408. If the data packet should be pre-processed using a local accelerator device 1312, the data packet processor 1508 sends some or all of the data packet to the local accelerator device 1312, where it may is pre-processed (e.g., decrypted) and then sent back to the data packet processor 1508.

If the data packet should be pre-processed using a remote accelerator device 1408, the data packet processor 1508 encapsulates the data packet with an encapsulating network packet. The encapsulating network packet may include some all of the data packet or only a portion of the data packet, such as only the encrypted payload of the data packet without some or all of the packet headers. The encapsulating network packet may include metadata or other information that indicate relevant parameters of the data packet. In the illustrative embodiment, the encapsulating network packet may be embodied as an Ethernet packet, and the virtual local area network (VLAN) tag of the network packet may indicate information such as, e.g., that the encapsulating network packet encapsulates the data packet, which accelerator device 1408 of a plurality of accelerator device 1408 to use, an FPGA partition or function to be executed, which processing elements are needed, the exact type of processing to be used, etc. The encapsulating network packet may include additional information, such as packet flow or pre-parsed details of the data packet, event data describing what functions should be performed on the data packet, encryption keys to use, transmission control protocol (TCP) or user datagram protocol (UDP) parameters, parameters of machine learning algorithms, etc. It should be appreciated that the encapsulating network packet and the data packet may both be packets of the same type, such as Ethernet packets. The data packet processor may then send the encapsulated network packet to a remote accelerator sled 1204 for pre-processing by a remote accelerator device 1408.

After the remote accelerator sled pre-processes the remote accelerator device 1408, the network interface manager 1502 may receive a return encapsulating network packet, which the data packet processor 1508 may decapsulate to recover the pre-processed data packet. The data packet processor 1508 stores the pre-processed data packet back into memory of the network interface controller 1310. The data packet processor 1508 may then take suitable subsequent action, such as passing the pre-processed data packet to the memory 1304 or the processor 1302. Of course, the data packet processor 1508 may pass the pre-processed data packet to the processor 1302 by first sending the pre-processed data packet to another component of the compute device 1202, such as the memory 1304. It should be appreciated that the network interface manager 1502 may provide for pre-processing of data packets to be sent by the network interface controller 1310 in addition to providing for pre-processing of data packets received by the network interface controller 1310. For example, the network interface controller 1310 may determine that a packet to be sent should be pre-processed (e.g., be encrypted), and provide for such pre-processing by use of a local accelerator device 1312 or a remote accelerator device 1408 in a similar manner as the pre-processing described above for a received data packet, which will not be repeated in the interest of clarity. In some embodiments, the network interface manager 1502 may send encapsulating network packets to a remote compute device 1202 for pre-processing by a remote accelerator device 1312 instead of to an accelerator sled 1204 for pre-processing by a remote accelerator device 1408. In such embodiments, the remote network interface manager 1502 may process encapsulating network packets in a similar manner as the network interface manager 1602 of the accelerator sled 1204 described below, and such functionality will not be described here as well in the interest of clarity.

Additionally or alternatively, in some embodiments, the data packet processor 1508 may facilitate transactions between two accelerator devices 1312, such as between an accelerator device 1312 on the local compute device 1202 and an accelerator device 1312 on a remote compute device 1202 or between an accelerator device 1312 on the local compute device 1202 and an accelerator device 1508 on an accelerator sled 1204. The data packet processor 1508 may receive an encapsulated transaction embodied as an encapsulating network packet from a remote compute device 1202 or accelerator sled 1204. The encapsulating network packet may be embodied as any suitable network packet, such as an Ethernet packet, an Infiniband packet, or an Omni-Path packet. The encapsulating network packet may include both transaction content as well as metadata relating to the transaction content. The encapsulating network packet may include the transaction type, such as a memory read request, a memory write request, or an instruction to perform a certain operation. The encapsulating network packet may also include transaction data, such as a memory location, data to be written to memory, and/or the like. In some embodiments, the data packet processor 1508 may examine a priority field in the VLAN tag of the encapsulating Ethernet network packet to determine whether the network packet encapsulates a transaction and/or what the type of the encapsulated transaction is. The data packet processor 1508 may decapsulate such an encapsulating network packet and pass the transaction content to the accelerator device 1312, with or without the transaction metadata included in the encapsulating network packet. Similarly, the data packet processor 1508 may receive a transaction from the accelerator device 1312 to be sent to a remote accelerator device 1312, 1408. The data packet processor 1508 may encapsulate such a transaction in an encapsulating network packet, and may include transaction metadata in the encapsulating network packet. The data packet processor 1508 may include metadata such as the transaction type. In some embodiments, the data packet processor 1508 may specify a priority field in the VLAN tag of the encapsulating Ethernet network packet to indicate whether the network packet encapsulates a transaction and/or what the type of the encapsulated transaction is. The data packet processor 1508 may then send the encapsulating network packet to the remote accelerator device 1312, 1408. In some embodiments, the data packet processor 1508 may receive response data back from the remote accelerator device 1312, 1408, which may be encapsulated as well. It should be appreciated that such functionality may allow several accelerator devices 1312, 1408 to communicate and coordinate together in a low-latency manner without requiring interaction with a processor 1302. For example, the compute device 1202 or a remote compute device 1202 may load one or more functions, programs, and/or the like into two or more accelerator devices 1312, 1408, which may then execute the one or more functions, programs, and/or the like with use of the encapsulated transactions described above to communicate between the accelerator devices 1312, 1408.

The local accelerator communicator 1510 is configured to send and receive messages and signals to and from the accelerator device 1312. The network communicator 1506 may send messages or other data from the memory of the network interface controller 1310 and may receive messages or other data from the accelerator device 1312 to the memory of the network interface controller 1310.

The host communicator 1512 is configured to send and receive message and signals to and from other components of the compute device 1202, such as the I/O subsystem 1306, the memory 1304, and/or the processor 1302. The host communicator 1512 may send messages or other data from the memory of the network interface controller 1310 and may receive messages or other data from other components of the compute device 1202 to the memory of the network interface controller 1310.

The accelerator controller 1504 is configured to control the accelerator device 1312. The accelerator controller 1504 may load programs or other data onto the accelerator device 1312, may execute programs on the accelerator device 1312, and may read data from the accelerator device 1312. The accelerator controller may prepare transactions to be sent to remote accelerator devices 1312, 1408. Preparing a transaction may include determining a transaction type, such as a memory read request, a memory write request, or an instruction to perform a certain operation. The transaction may also include transaction data, such as a memory location, an address or location of the destination accelerator device 1312, 1408, data to be written to memory, and/or the like. In the illustrative embodiment, the accelerator controller 1504 sends the transaction information to the network interface manager 1502, which may then fully prepare the transaction, such as by including metadata or formatting the transaction data, encapsulate the transaction in an encapsulating network packet, and send the encapsulating network packet to a remote compute device 1202 or accelerator sled 1204. Additionally or alternatively, the accelerator controller 1504 may send a fully prepared transaction, with or without metadata, to the network interface manager 1502, and/or the accelerator controller 1504 may encapsulate the transaction in a network packet before passing the encapsulating network packet to the network interface manager 1502 for transmission. In a similar manner, the accelerator controller 1504 may receive transactions from remote accelerator devices 1312, 1408 passed through the network interface manager 1502. In the illustrative embodiment, the network interface manager 1502 will provide unencapsulated transaction data, with or without metadata, to the accelerator controller 1504. Additionally or alternatively, the network interface manager 1502 may provide the transaction data, with or without metadata, encapsulated in a network packet to the accelerator controller 1504, which the accelerator controller 1504 may remove or otherwise process in order to access the transaction data. The accelerator controller 1504 may then process the transaction data, such as by reading or writing data, loading a program or operation into the accelerator device 1312, executing a program or operation on the accelerator device 1312, etc. Execution of the transaction may provide an output, which the accelerator controller 1504 may send through another transaction to another accelerator device 1312, 1408.

Additionally or alternatively, in some embodiments, the accelerator controller 1504 may pre-process a data packet or data in a data packet. For example, as described above, the network interface manager 1502 may provide a local accelerator device 1312 with a data packet received by the network interface controller 1310 for pre-processing, such as decryption. The accelerator controller 1504 may use the accelerator device 1312 to decrypt the data packet or data in the data packet and pass the decrypted data packet or data in the data packet back to the network interface manager 1502. The accelerator controller 1504 may similarly encrypt data packets or data of data packets before the data packets are sent by the network interface manager 1502. The accelerator controller may also perform pre-processing on data packets that were sent to the network interface manager 1502 for pre-processing, such as a data packet encapsulated in a network packet sent by a remote network interface manager 1502.

Figure 16:
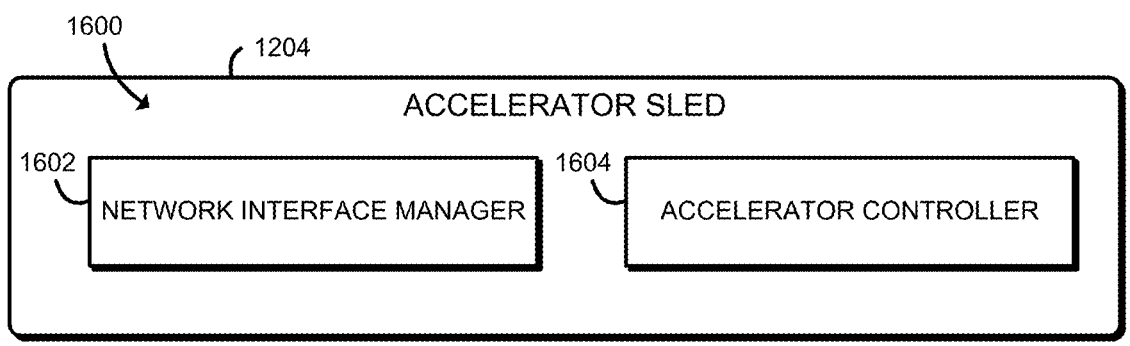
FIG. 16 is a block diagram of at least one embodiment of an environment that may be established by the accelerator of FIG. 12.

Referring now to FIG. 16, in use, the accelerator sled 1204 may establish an environment 1600. The illustrative environment 1600 includes a network interface manager 1602 and an accelerator controller 1604. The various components of the environment 1600 may be embodied as hardware, firmware, software, or a combination thereof. As such, in some embodiments, one or more of the components of the environment 1600 may be embodied as circuitry or collection of electrical devices (e.g., a network interface manager circuit 1602, an accelerator controller circuit 1604, etc.). It should be appreciated that, in such embodiments the network interface manager circuit 1602, the accelerator controller circuit 1504, etc., may form a portion of one or more of the processor 1402, the I/O subsystem 1406, the network interface controller 1410, and/or other components of the accelerator sled 1204. Additionally, in some embodiments, one or more of the illustrative components may form a portion of another component and/or one or more of the illustrative components may be independent of one another. Further, in some embodiments, one or more of the components of the environment 1600 may be embodied as virtualized hardware components or emulated architecture, which may be established and maintained by the processor 1402 or other components of the accelerator sled 1204.

The network interface manager 1602 is configured to control the network interface controller 1410. In the illustrative embodiment, the network interface manager 1602 may receive an encapsulating network packet from a remote compute device 1202. The network interface manager 1602 may decapsulate the encapsulating network packet to access the encapsulated data packet included in the network packet. The network interface manager 1602 may then pass the data packet or the data in the data packet to the accelerator controller 1604 for pre-processing by the accelerator device 1408, such as decryption. The network interface manager 1602 may then receive the unencrypted data packet or the unencrypted data in the data packet from the accelerator controller 1604. The network interface manager 1602 may then encapsulate the data packet in a network packet, and send the encapsulating network packet to the remote compute device 1202.

Additionally or alternatively, the network interface manager 1602 may perform similar functions as the network interface manager 1502, such as encapsulating incoming data packets for sending to a remote compute device 1202 for pre-processing or sending and receiving transactions to and from the accelerator device 1408 for communication with remote accelerator devices 1312, 1408. The description of this functionality is described above in FIG. 15 in regard to the network interface manager 1502 and will not be repeated herein in the interest of clarity.

The accelerator controller 1604 is configured to control the accelerator device 1408. In the illustrative embodiment, the accelerator controller 1604 receives a data packet or data in a data packet from the network interface manager 1602, pre-processes the data packet or data in the data packet (such as by decrypting the data or data packet), and passes the pre-processed data or data packet back to the network interface manager 1602. Additionally or alternatively, the accelerator controller 1604 may perform similar functions as the accelerator controller 1504, such as generating transactions for processing by remote accelerator devices 1312, 1408 or processing transactions received from remote accelerator devices 1312, 1408. The description of this functionality is described above in FIG. 1225 in regard to the accelerator controller 1504 and will not be repeated herein in the interest of clarity.

Figure 17:
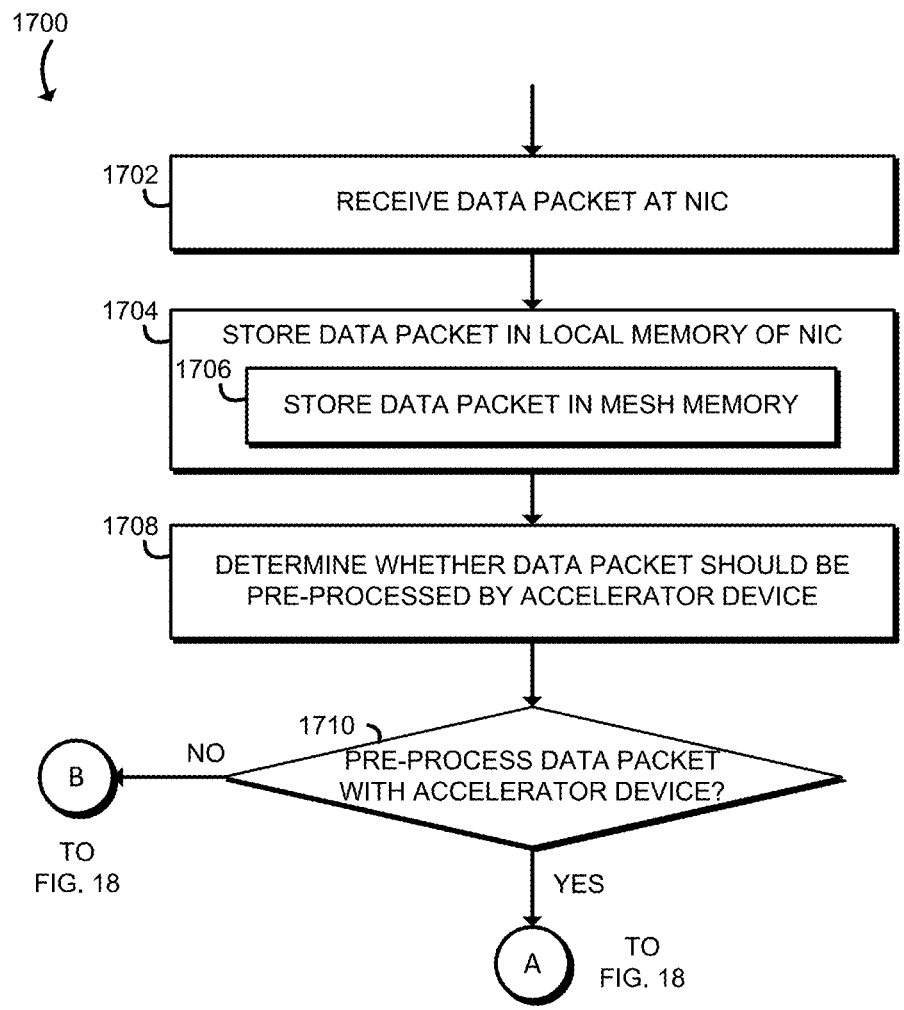
FIGS. 17 & 18 are a simplified flow diagram of at least one embodiment of a method for pre-processing a data packet with an accelerator that may be executed by the compute device of FIG. 12.

Referring now to FIG. 17, in use, the compute device 1202 may execute a method 1700 for pre-processing a data packet with an accelerator device 1312, 1408. The method 1700 begins in block 1702, in which the compute device 1202 receives a data packet at the network interface controller (NIC) 1310. In block 1704, the compute device 1202 stores the data packet in local memory of the NIC 1310. In some embodiments, the compute device 1202 may store the data packet in a mesh memory of the NIC 1310.

In block 1708, the compute device 1202 may determine whether the data packet should be pre-processed by an accelerator device 1312, 1408. The compute device 1202 may determine whether the data packet should be pre-processed in any suitable manner, such as by considering the flow of the data packet or information associated with the flow of the data packet or by determining whether the data packet is encrypted.

Figure 18:
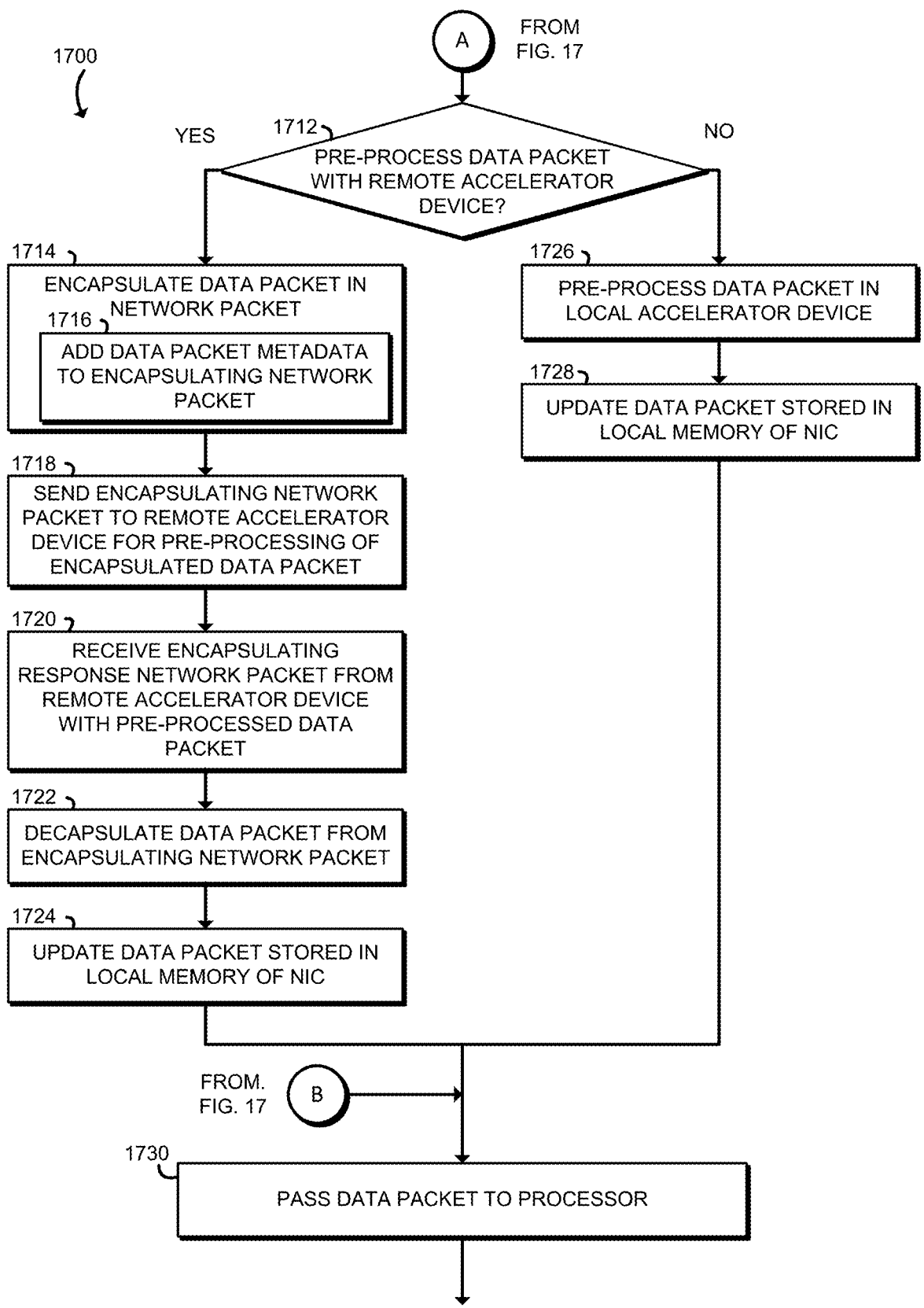

In block 1710, if the compute device 1202 is not to pre-process the data packet with an accelerator device 1312, 1408, the method 1700 jumps to block 1730 in FIG. 18, in which the compute device 1202 passes the data packet from the NIC 1310 to the processor 1202. Referring back to block 1710, if the compute device 1202 is to pre-process the data packet with an accelerator device, the method 1700 jumps to block 1712 in FIG. 18, in which the compute device 1202 decides whether to pre-process the data packet with a remote accelerator device 1312, 1408 or a local accelerator device 1312, 1408. If the compute device 1202 is to pre-process the data packet with a remote accelerator device 1312, 1408, the method 1700 proceeds to block 1714, in which the compute device 1202 encapsulates the data packet with a network packet. The network packet could be any suitable network packet, such as an Ethernet packet, an Infiniband packet, or an Omni-Path packet. In the illustrative embodiment, the encapsulating network packet may be embodied as an Ethernet packet, and the virtual local area network (VLAN) tag of the network packet may indicate that the encapsulating network packet encapsulates the data packet. It should be appreciated that the encapsulating network packet may by the same type of packet as the data packet. The compute device 1202 may add metadata of the data packet to the encapsulating network packet, such as the length of the network packet, the type of pre-processing to be done, etc., in block 1716.

In block 1718, the compute device 1202 sends the encapsulating network packet to a remote accelerator device 1312, 1408, which may be on a remote compute device 1202 or an accelerator sled 1204, for preprocessing of the encapsulated data packet. In block 1720, the compute device 1202 receives an encapsulating network packet back from the remote accelerator device 1312, 1408, including the pre-processed data packet.

In block 1722, the compute device 1202 decapsulates the data packet from the encapsulating network packet received from the remote accelerator device 1312, 1408. In block 1724, the compute device 1202 updates the data packet stored in the local memory of the NIC 1310.

Referring back to block 1712, if the compute device 1202 is not to pre-process the data packet with a remote accelerator device 1312, 1408, the method 1700 proceeds to block 1726, in which the compute device 1202 pre-processes the data packet in a local accelerator device 1312, 1408. In block 1728, the compute device 1202 updates the data packet stored in the local memory of the NIC 1310.

In block 1730, the compute device 1202 passes the data packet to the processor 1202. It should be appreciated that the compute device 1202 may pass the data packet to the processor 1202 by first passing the data packet to an intermediate component, such as the memory 1204 or the I/O subsystem 1206. It should also be appreciated that, in some embodiments, the compute device 1202 may additionally or alternatively pass the packet to other components of the compute device 102, such as to another accelerator device 1312, or even to another device on the network 1206, such as if the compute device 1202 is performing a switch or routing function.

Figure 19:
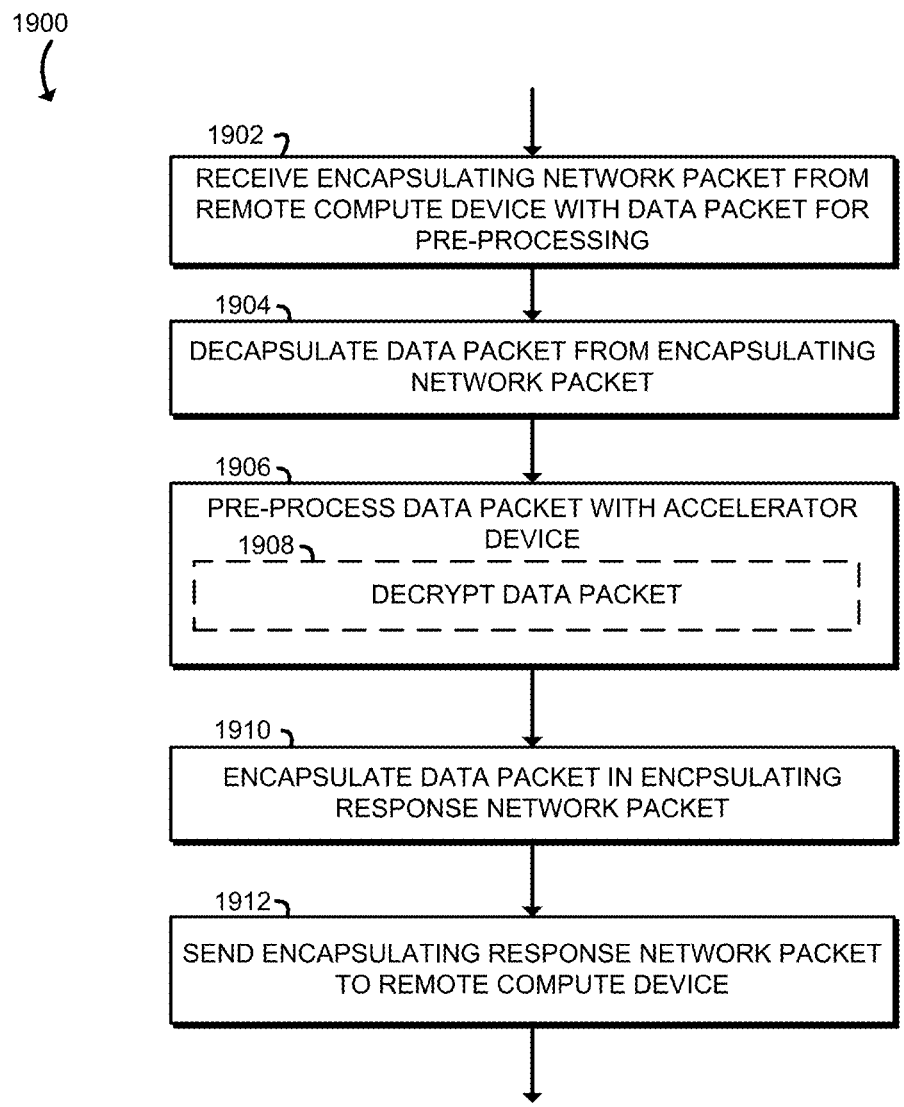

Referring now to FIG. 19, in use, the accelerator sled 1204 may execute a method 1900 for pre-processing a data packet with an accelerator device 1408. The method 1900 begins in block 1902, in which the accelerator sled 1204 receives an encapsulating network packet from a remote compute device 1202. The encapsulating network packet encapsulates a data packet, and the encapsulating network packet is sent by the compute device 1202 to the accelerator sled 1204 for pre-processing of the data packet. The network packet may be any suitable type of packet, such as an Ethernet packet, an Infiniband packet, or an Omni-Path packet. In the illustrative embodiment, the encapsulating network packet is be embodied as an Ethernet packet, and the virtual local area network (VLAN) tag of the network packet may indicate that the encapsulating network packet encapsulates the data packet.

In block 1904, the accelerator sled 1204 decapsulates the data packet from the encapsulating network packet. The encapsulating network packet may include metadata, such as the data indicating type of pre-processing to be done and/or the length of the data packet. The accelerator sled 1204 then pre-processes the data packet or data in the data packet with use of an accelerator device 1408 in block 1906. In the illustrative embodiment, the accelerator sled 1204 decrypts the data packet or data in the data packet in block 1908.

In block 1910, the accelerator sled 1204 encapsulates the pre-processed data packet in an encapsulating response network packet. The encapsulating response network packet may be any suitable type of network packet, such as an Ethernet packet, an Infiniband packet, or an Omni-Path packet. The encapsulating response network packet may include metadata, such as the data indicating type of pre-processing done and/or the length of the pre-processed data packet. In block 1912, the accelerator sled 1204 sends the encapsulating response network packet to the remote compute device 1202.

Figure 20:
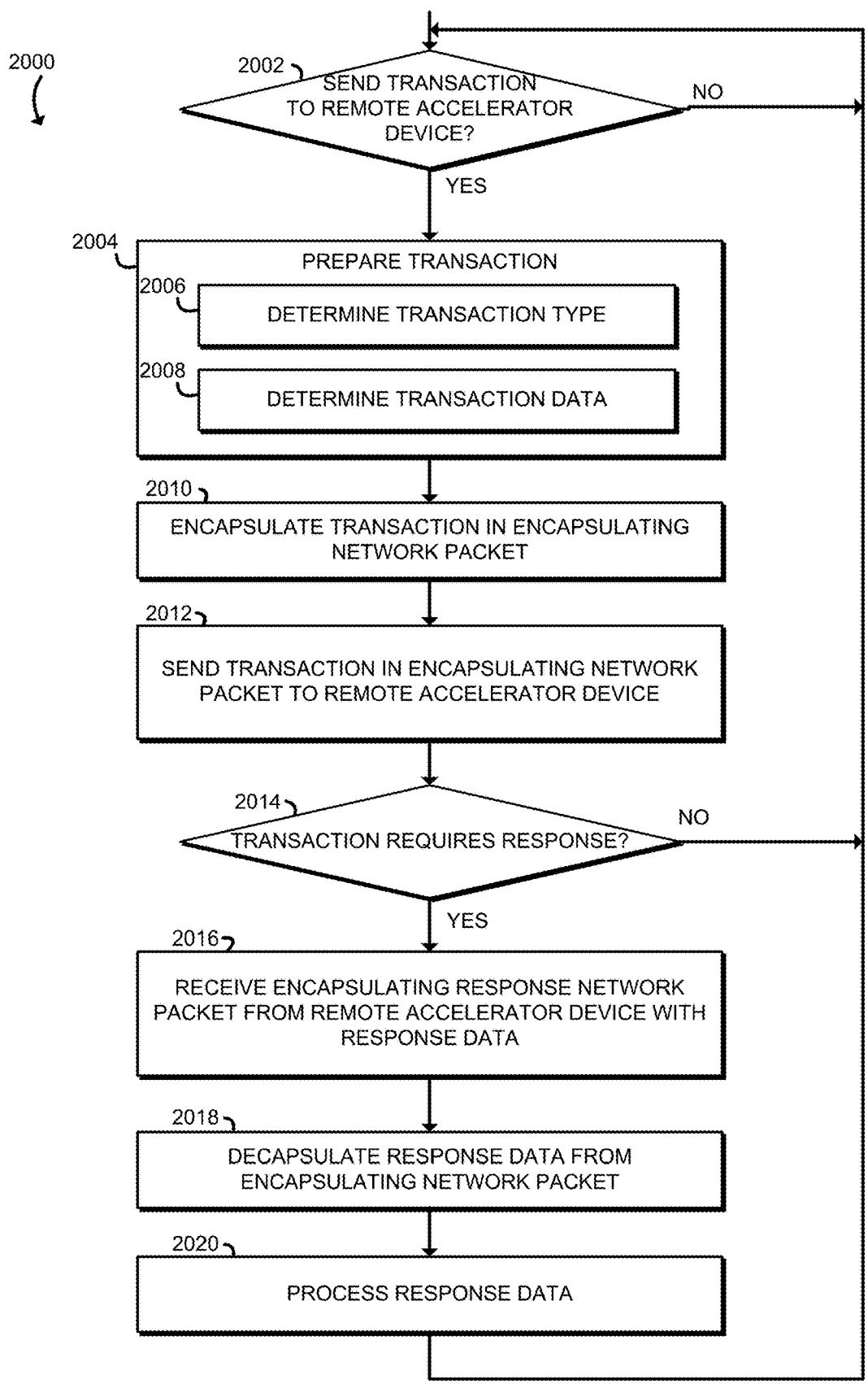
FIG. 20 is a simplified flow diagram of at least one embodiment of a method for sending a transaction to a remote accelerator device that may be executed by the compute device of FIG. 12.

Referring now to FIG. 20, in use, the compute device 1202 may execute a method 2000 for sending a transaction from a local accelerator device 1312 to a remote accelerator device 1312, 1408. The method 2000 begins in block 2002, where, if the compute device 1202 is not to send a transaction to a remote accelerator device 1312, 1408, the method 2000 loops back to block 2002 to wait for a transaction to be sent. If the compute device 1202 is to send a transaction to a remote accelerator device 1312, 1408, the method 2000 proceeds to block 2002, in which the compute device 1202 prepares a transaction to be sent to a remote accelerator device 1312, 1408. The compute device 1202 may prepare a transaction for any suitable purpose. For example, the accelerator device 1312 of the compute device 1202 may require a transaction be performed with a remote accelerator device 1312, 1408, such as a transaction to read or write data, to load or execute a program or other operation, etc. The compute device may determine a transaction type in block 2006 and may determine transaction data in block 2008. The transaction data and/or transaction type may be included in the transaction to be sent. The transaction may be constructed from transaction metadata and transaction content. The transaction metadata may indicate the type of transaction, the address of a memory to be accessed as part of the transaction, a length of the transaction content, etc. The transaction content may be the particular data to be written to memory, a particular program to be loaded onto the remote accelerator device 1312, 1408, and/or the like. Of course, some transactions may only include metadata, such as a read request of a particular memory location, without including any other transaction content.

In block 2010, the compute device 1202 encapsulates the transaction in an encapsulating network packet. The encapsulating network packet may include both transaction metadata and transaction content. In the illustrative embodiment, the encapsulating network packet may be embodied as an Ethernet packet, and the virtual local area network (VLAN) tag of the network packet may indicate that the encapsulating network packet encapsulates a transaction. In block 2012, the compute device 1202 sends the encapsulating network packet to a remote accelerator device 1312, 1408.

In block 2014, if the transaction does not require a response, the method 2000 loops back to block 2002 to wait until another transaction is to be sent. If the transaction does require a response, such as a memory read request, the method 2000 proceeds to block 2016, in which the compute device 1202 receives an encapsulating response network packet from the response accelerator device 1312, 1408 with response data. It should be appreciated that, in some embodiments, several responses may be aggregated together into one response, such as by using large receive offload (LRO) and/or similar techniques.

In block 2018, the compute device 1202 decapsulates the response data from the encapsulating network packet. The response data may be any suitable response data, such as a result of a memory read request or a result of a requested function or operation. In block 2020, the compute device 1202 may process the response data. Of course, in some embodiments, the compute device 1202 may simply store the response data for use at a later time.

Figure 21:
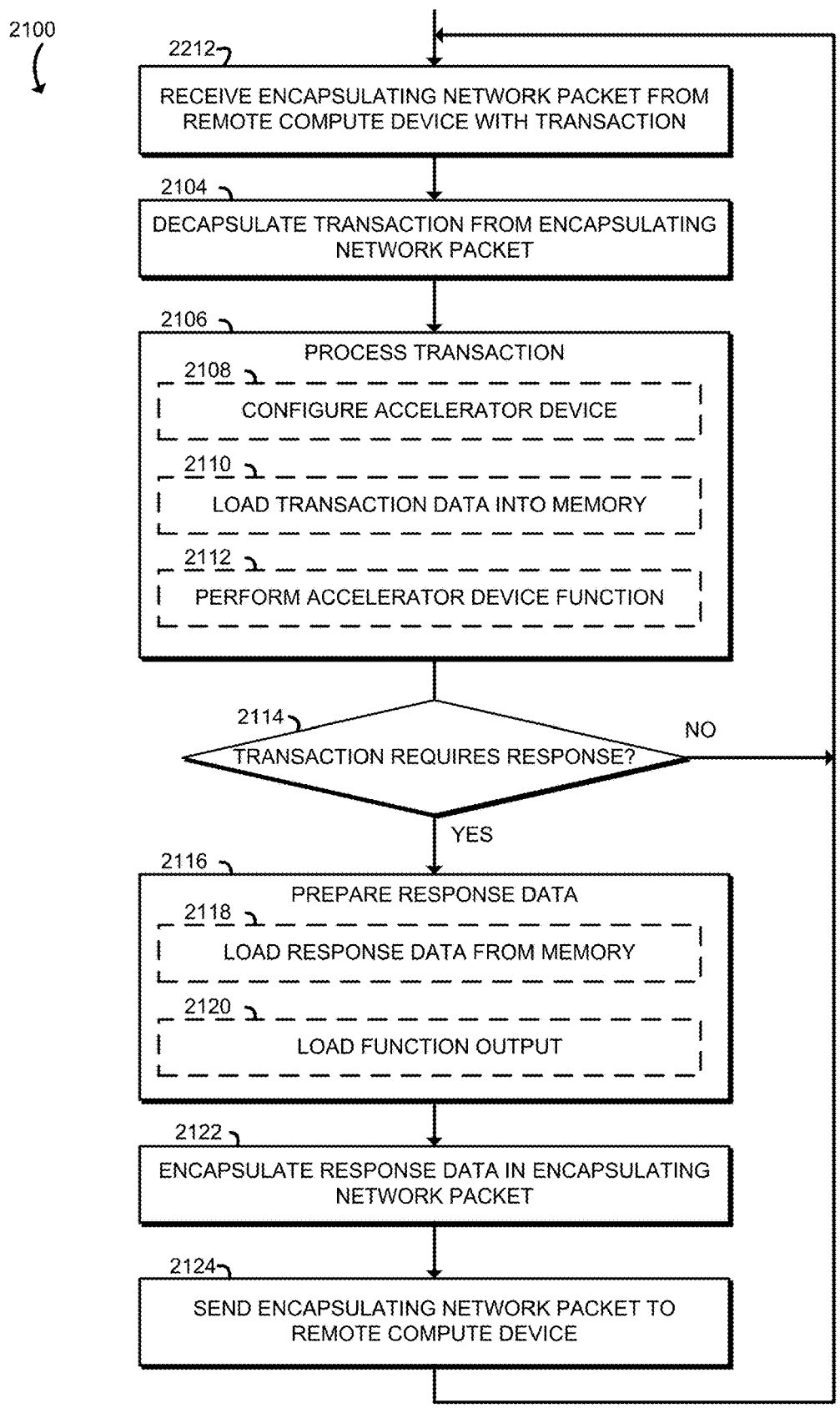
FIG. 21 is a simplified flow diagram of at least one embodiment of a method for receiving a transaction from a remote compute device that may be executed by the accelerator sled of FIG. 12.

Referring now to FIG. 21, in use, the accelerator sled 1204 may execute a method 2100 for sending a transaction from a local accelerator device 1312 to a remote accelerator device 1312, 1408. The method 2100 begins in block 2102, in which the compute device 1202 receives an encapsulating network packet from a remote compute device 1202. The encapsulating network packet includes a transaction to be processed or executed by the accelerator device 1408.

In block 2104, the accelerator sled 1204 decapsulates the transaction from the encapsulating network packet. In the illustrative embodiment, the encapsulating network packet may be embodied as an Ethernet packet, and the virtual local area network (VLAN) tag of the network packet may indicate that the encapsulating network packet encapsulates a transaction. The transaction may be constructed from transaction metadata and transaction content. The transaction metadata may indicate the type of transaction, the address of a memory to be accessed as part of the transaction, a length of the transaction content, etc. The transaction content may be the particular data to be written to memory, a particular program to be loaded onto the accelerator device 1408, and/or the like. Of course, some transactions may only include metadata, such as a read request of a particular memory location, without including any other transaction content.

In block 2106, the accelerator sled 1204 processes the transaction. In some embodiments, the accelerator sled 1204 may configure the accelerator device 1408 based on the transaction in block 2108, such as by loading a particular function or program into the accelerator device 1408. Additionally or alternatively, in other embodiments, the accelerator sled 1204 may load transaction data into a memory location in block 2110. In still other embodiments, the accelerator sled 1204 may perform a function of the accelerator device 1408 in block 2112, such as encrypting or decrypting a message.

In block 2114, if the transaction does not require a response, the method 2100 loops back to block 2102 to receive a subsequent transaction. If the transaction does require a response, the method 2100 proceeds to block 2116, in which the accelerator sled 1204 prepares response data based on the processed or executed transaction. In some embodiments, the accelerator sled 1204 may load response data from memory of the accelerator device 1408 in block 2118. Additionally or alternatively, in some embodiments, the accelerator sled 1204 may load output of a function or operation of the accelerator device 1408 in block 2120.

In block 2122, the accelerator sled 1204 encapsulates the response data in an encapsulating response network packet. The encapsulating response network packet may be embodied similarly as the encapsulating network packet. In particular, the encapsulating response network packet may be embodied as a transaction encapsulated by the network packet. In block 2124, the accelerator sled 1204 sends the encapsulating response network packet to the compute device 1202.

It should be appreciated that, while the illustrative compute device 1202 and accelerator sled 1204 may have different sets of hardware components and different roles as described above, in some embodiments, the compute device 1202 may have similar or the same set of hardware components and functionality as the accelerator sled 1204, and the accelerator sled may have similar or the same set of hardware components and functionality as the compute device 1202. Additionally or alternatively to the embodiments discussed above, some embodiments may have the roles of the compute device 1202 and the accelerator sled 1204 reversed. For example, an accelerator sled 1204 may receive a data packet that is to be pre-processed and send the data packet in an encapsulating network packet to a remote compute device 1202 for pre-processing. In another example, an accelerator device 1408 on an accelerator sled 1204 may send an encapsulated transaction to a compute device 1202 for processing on the accelerator device 1312. In still other embodiments, the network interface controller 1310 may act as a network accelerator or cryptographic accelerator for the accelerator device 1312. For example, the accelerator device 1312 may pass transaction information to the network interface controller 1310, which may be configured to encapsulate the transaction information into an encapsulating network packet, optionally encrypt the encapsulating network packet, and send the encapsulated network packet to another device on the network 1206.

EXAMPLES

Illustrative examples of the devices, systems, and methods disclosed herein are provided below. An embodiment of the devices, systems, and methods may include any one or more, and any combination of, the examples described below.

Example 1 includes a compute device for facilitating communication between a network interface controller of a compute device and a remote accelerator device, the compute device comprising a processor; and a network interface controller to receive a data packet; encapsulate the data packet in an encapsulating network packet; send the encapsulating network packet to a remote accelerator device for pre-processing; receive, from the remote accelerator device, an encapsulating response network packet which includes a pre-processed data packet; and pass the pre-processed data packet to a processor of the compute device.

Example 2 includes the subject matter of Example 1, and wherein to encapsulate the data packet in the encapsulating network packet comprises to encapsulate the data packet in an Ethernet packet.

Example 3 includes the subject matter of any of Examples 1 and 2, and wherein to encapsulate the data packet in the Ethernet packet comprises to provide an indication in a virtual local area network (VLAN) tag of the Ethernet packet that the encapsulating Ethernet packet comprises the data packet.

Example 4 includes the subject matter of any of Examples 1-3, and wherein to send the encapsulating network packet to the remote accelerator device for pre-processing comprises to send the encapsulating network packet to the remote accelerator device for decrypting, and wherein to receive the encapsulating response network packet which includes the pre-processed data packet comprises to receive the encapsulating response network packet which includes the data packet after decryption.

Example 5 includes the subject matter of any of Examples 1-4, and further including a local accelerator device, wherein the network interface controller is further to receive a second data packet; and pass the second data packet to the local accelerator device for pre-processing, wherein the local accelerator device is to pre-process the second data packet and pass the pre-processed second data packet to the network interface controller, wherein the network interface controller is further to pass the pre-processed second data packet to the processor of the compute device.

Example 6 includes the subject matter of any of Examples 1-5, and wherein to pre-process the second data packet comprises to decrypt the second data packet.

Example 7 includes the subject matter of any of Examples 1-6, and further including a local accelerator device to pass transaction data to the network interface controller, wherein the transaction data indicates a transaction to be performed on the remote accelerator device, wherein the network interface controller is further to encapsulate the transaction data in a second encapsulating network packet; and send the second encapsulating network packet to the remote compute device.

Example 8 includes the subject matter of any of Examples 1-7, and further including a local accelerator device, wherein the network interface controller is further to receive a second encapsulating network packet, wherein the second encapsulating network packet encapsulates transaction data; and pass the transaction data to the local accelerator device, wherein the accelerator device is to perform, a transaction based on the transaction data.

Example 9 includes a compute device for facilitating communication between a local accelerator device of a compute device and a remote accelerator device of a remote compute device, the compute device comprising a local accelerator device to pass transaction data to a network interface controller of the compute device, wherein the transaction data indicates a transaction to be performed on a remote accelerator device; and the network interface controller to encapsulate the transaction data in an encapsulating network packet; and send the encapsulating network packet to a remote compute device.

Example 10 includes the subject matter of Example 9, and wherein to encapsulate the transaction data in the encapsulating network packet comprises to encapsulate the transaction data in an Ethernet packet.

Example 11 includes the subject matter of any of Examples 9 and 10, and wherein to encapsulate the transaction data in the Ethernet packet comprises to provide an indication in a virtual local area network (VLAN) tag of the Ethernet packet that the encapsulating Ethernet packet comprises the transaction data.

Example 12 includes the subject matter of any of Examples 9-11, and wherein the network interface controller is further to receive a second encapsulating network packet, wherein the second encapsulating network packet encapsulates second transaction data; and pass the second transaction data to the local accelerator device of the compute device, wherein the local accelerator device is further to perform a transaction based on the second transaction data.

Example 13 includes the subject matter of any of Examples 9-12, and wherein the second encapsulating network packet is an Ethernet packet.

Example 14 includes the subject matter of any of Examples 9-13, and wherein the network interface controller is further to analyze a virtual local area network (VLAN) tag of the Ethernet packet, wherein to pass the second transaction data to the local accelerator device comprises to pass, based on the VLAN tag of the Ethernet packet, the second transaction data to the local accelerator device.

Example 15 includes a compute device for facilitating communication between a network interface controller of a compute device and a remote accelerator device, the compute device comprising a processor to pass a data packet to a network interface controller; and the network interface controller to encapsulate the data packet in an encapsulating network packet; send the encapsulating network packet to the remote accelerator device for pre-processing; receive, from the remote accelerator device, an encapsulating response network packet which includes a pre-processed data packet; and send the pre-processed data packet over a network.

Example 16 includes the subject matter of Example 15, and wherein to encapsulate the data packet in the encapsulating network packet comprises to encapsulate the data packet in an Ethernet packet.

Example 17 includes the subject matter of any of Examples 15 and 16, and wherein to encapsulate the data packet in the Ethernet packet comprises to provide an indication in a virtual local area network (VLAN) tag of the Ethernet packet that the encapsulating Ethernet packet comprises the data packet.

Example 18 includes the subject matter of any of Examples 15-17, and wherein to send the encapsulating network packet to the remote accelerator device for pre-processing comprises to send the encapsulating network packet to the remote accelerator device for encrypting, and wherein to receive the encapsulating response network packet which includes the pre-processed data packet comprises to receive the encapsulating response network packet which includes the data packet after encryption.

Example 19 includes the subject matter of any of Examples 15-18, and further including a local accelerator device, wherein the processor is further to pass a second data packet to the network interface controller, wherein the network interface controller is further to pass the second data packet to the local accelerator device for pre-processing, wherein the local accelerator device is to pre-process the second data packet and pass the pre-processed second data packet to the network interface controller, wherein the network interface controller is further to send the pre-processed second data packet over the network.

Example 20 includes the subject matter of any of Examples 15-19, and wherein to pre-process the second data packet comprises to encrypt the second data packet.

Example 21 includes the subject matter of any of Examples 15-20, and further including a local accelerator device to pass transaction data to the network interface controller, wherein the transaction data indicates a transaction to be performed on the remote accelerator device, wherein the network interface controller is further to encapsulate the transaction data in a second encapsulating network packet; and send the second encapsulating network packet to the remote compute device.

Example 22 includes the subject matter of any of Examples 15-21, and further including a local accelerator device, wherein the network interface controller is further to receive a second encapsulating network packet, wherein the second encapsulating network packet encapsulates transaction data; and pass the transaction data to the local accelerator device, wherein the accelerator device is to perform, a transaction based on the transaction data.

Example 23 includes a method for facilitating communication between a network interface controller of a compute device and a remote accelerator device, the method comprising receiving, by the network interface controller, a data packet; encapsulating, by the network interface controller, the data packet in an encapsulating network packet; sending, by the network interface controller, the encapsulating network packet to the remote accelerator device for pre-processing; receiving, by the network interface controller and from the remote accelerator device, an encapsulating response network packet which includes the pre-processed data packet; and passing, by the network interface controller, the pre-processed data packet to a processor of the compute device.

Example 24 includes the subject matter of Example 23, and wherein encapsulating the data packet in the encapsulating network packet comprises encapsulating the data packet in an Ethernet packet.

Example 25 includes the subject matter of any of Examples 23 and 24, and wherein encapsulating the data packet in the Ethernet packet comprises providing an indication in a virtual local area network (VLAN) tag of the Ethernet packet that the encapsulating Ethernet packet comprises the data packet.

Example 26 includes the subject matter of any of Examples 23-25, and wherein sending the encapsulating network packet to the remote accelerator device for pre-processing comprises sending the encapsulating network packet to the remote accelerator device for decryption, and wherein receiving the encapsulating response network packet which includes the pre-processed data packet comprises receiving the encapsulating response network packet which includes the data packet after decryption.

Example 27 includes the subject matter of any of Examples 23-26, and further including receiving, by the network interface controller, a second data packet; passing, by the network interface controller, the second data packet to a local accelerator device for pre-processing; pre-processing, by the local accelerator device, the second data packet; passing, by the local accelerator device, the pre-processed second data packet to the network interface controller; and passing, by the network interface controller, the pre-processed second data packet to the processor of the compute device.

Example 28 includes the subject matter of any of Examples 23-27, and wherein pre-processing the second data packet comprises decrypting the second data packet.

Example 29 includes the subject matter of any of Examples 23-28, and further including passing, by a local accelerator device of the compute device, transaction data to the network interface controller, wherein the transaction data indicates a transaction to be performed on the remote accelerator device; encapsulating, by the network interface controller, the transaction data in a second encapsulating network packet; and sending, by the network interface controller, the second encapsulating network packet to the remote compute device.

Example 30 includes the subject matter of any of Examples 23-29, and further including receiving, by the network interface controller, a second encapsulating network packet, wherein the second encapsulating network packet encapsulates transaction data; passing, by the network interface controller, the transaction data to a local accelerator device of the compute device; and performing, by the local accelerator device, a transaction based on the transaction data.

Example 31 includes a method for facilitating communication between a local accelerator device of a compute device and a remote accelerator device of a remote compute device, the method comprising passing, by the local accelerator device, transaction data to a network interface controller of the compute device, wherein the transaction data indicates a transaction to be performed on the remote accelerator device; encapsulating, by the network interface controller, the transaction data in an encapsulating network packet; and sending, by the network interface controller, the encapsulating network packet to the remote compute device.

Example 32 includes the subject matter of Example 31, and wherein encapsulating the transaction data in the encapsulating network packet comprises encapsulating the transaction data in an Ethernet packet.

Example 33 includes the subject matter of any of Examples 31 and 32, and wherein encapsulating the transaction data in the Ethernet packet comprises providing an indication in a virtual local area network (VLAN) tag of the Ethernet packet that the encapsulating Ethernet packet comprises the transaction data.

Example 34 includes the subject matter of any of Examples 31-33, and further including receiving, by the network interface controller, a second encapsulating network packet, wherein the second encapsulating network packet encapsulates second transaction data; passing, by the network interface controller, the second transaction data to the local accelerator device of the compute device; and performing, by the local accelerator device, a transaction based on the second transaction data.

Example 35 includes the subject matter of any of Examples 31-34, and wherein the second encapsulating network packet is an Ethernet packet.

Example 36 includes the subject matter of any of Examples 31-35, and further including analyzing a virtual local area network (VLAN) tag of the Ethernet packet, wherein passing the second transaction data to the local accelerator device comprises passing, based on the VLAN tag of the Ethernet packet, the second transaction data to the local accelerator device.

Example 37 includes a method for facilitating communication between a network interface controller of a compute device and a remote accelerator device, the method comprising passing, by a processor of the compute device, a data packet to the network interface controller, encapsulating, by the network interface controller, the data packet in an encapsulating network packet; sending, by the network interface controller, the encapsulating network packet to the remote accelerator device for pre-processing; receiving, by the network interface controller and from the remote accelerator device, an encapsulating response network packet which includes a pre-processed data packet; and sending, by the network interface controller, the pre-processed data packet over a network.

Example 38 includes the subject matter of Example 37, and wherein encapsulating the data packet in the encapsulating network packet comprises encapsulating the data packet in an Ethernet packet.

Example 39 includes the subject matter of any of Examples 37 and 38, and wherein encapsulating the data packet in the Ethernet packet comprises providing an indication in a virtual local area network (VLAN) tag of the Ethernet packet that the encapsulating Ethernet packet comprises the data packet.

Example 40 includes the subject matter of any of Examples 37-39, and wherein sending the encapsulating network packet to the remote accelerator device for pre-processing comprises sending the encapsulating network packet to the remote accelerator device for encrypting, and wherein receiving the encapsulating response network packet which includes the pre-processed data packet comprises receiving the encapsulating response network packet which includes the data packet after encryption.

Example 41 includes the subject matter of any of Examples 37-40, and further including passing, by the processor, a second data packet to the network interface controller; passing, by the network interface controller, the second data packet to a local accelerator device for pre-processing; pre-processing, by the local accelerator device, the second data packet; passing, by the local accelerator device, a pre-processed second data packet to the network interface controller; and sending, by the network interface controller, the pre-processed second data packet over the network.

Example 42 includes the subject matter of any of Examples 37-41, and wherein pre-processing the second data packet comprises encrypting the second data packet.

Example 43 includes the subject matter of any of Examples 37-42, and further including passing, by a local accelerator device of the compute device, transaction data to the network interface controller, wherein the transaction data indicates a transaction to be performed on the remote accelerator device; encapsulating, by the network interface controller, the transaction data in a second encapsulating network packet; and sending, by the network interface controller, the second encapsulating network packet to the remote compute device.

Example 44 includes the subject matter of any of Examples 37-43, and further including receiving, by the network interface controller, a second encapsulating network packet, wherein the second encapsulating network packet encapsulates transaction data; passing, by the network interface controller, the transaction data to a local accelerator device of the compute device; and performing, by the local accelerator device, a transaction based on the transaction data.

Example 45 includes one or more computer-readable media comprising a plurality of instructions stored thereon that, when executed, causes a compute device to perform the method of any of Examples 23-44.

Example 46 includes a compute device for facilitating communication between a network interface controller of a compute device and a remote accelerator device, the compute device comprising circuitry for receiving a data packet at the network interface controller; means for encapsulating the data packet in an encapsulating network packet; circuitry for sending the encapsulating network packet to the remote accelerator device for pre-processing; circuitry for receiving, from the remote accelerator device, an encapsulating response network packet which includes the pre-processed data packet; and means for passing the pre-processed data packet to a processor of the compute device.

Example 47 includes the subject matter of Example 46, and wherein the means for encapsulating the data packet in the encapsulating network packet comprises means for encapsulating the data packet in an Ethernet packet.

Example 48 includes the subject matter of any of Examples 46 and 47, and wherein the means for encapsulating the data packet in the Ethernet packet comprises means for providing an indication in a virtual local area network (VLAN) tag of the Ethernet packet that the encapsulating Ethernet packet comprises the data packet.

Example 49 includes the subject matter of any of Examples 46-48, and wherein the circuitry for sending the encapsulating network packet to the remote accelerator device for pre-processing comprises circuitry for sending the encapsulating network packet to the remote accelerator device for decrypting, and wherein the circuitry for receiving the encapsulating response network packet which includes the pre-processed data packet comprises circuitry for receiving the encapsulating response network packet which includes the data packet after decryption.

Example 50 includes the subject matter of any of Examples 46-49, and further including circuitry for receiving a second data packet; means for passing the second data packet to a local accelerator device for pre-processing; means for pre-processing, by the local accelerator device, the second data packet; means for passing the pre-processed second data packet to the network interface controller; and means for passing the pre-processed second data packet to the processor of the compute device.

Example 51 includes the subject matter of any of Examples 46-50, and wherein the means for pre-processing the second data packet comprises means for decrypting the second data packet.

Example 52 includes the subject matter of any of Examples 46-51, and further including means for passing, by a local accelerator device of the compute device, transaction data to the network interface controller, wherein the transaction data indicates a transaction to be performed on the remote accelerator device; means for encapsulating the transaction data in a second encapsulating network packet; and means for sending the second encapsulating network packet to the remote compute device.

Example 53 includes the subject matter of any of Examples 46-52, and further including circuitry for receiving a second encapsulating network packet, wherein the second encapsulating network packet encapsulates transaction data; means for passing, by the network interface controller, the transaction data to a local accelerator device of the compute device; and means for performing, by the local accelerator device, a transaction based on the transaction data.

Example 54 includes a compute device for facilitating communication between a local accelerator device of a compute device and a remote accelerator device of a remote compute device, the compute device comprising means for passing, by the local accelerator device, transaction data to a network interface controller of the compute device, wherein the transaction data indicates a transaction to be performed on the remote accelerator device; means for encapsulating, by the network interface controller, the transaction data in an encapsulating network packet; and circuitry for sending, by the network interface controller, the encapsulating network packet to the remote compute device.

Example 55 includes the subject matter of Example 54, and wherein the means for encapsulating the transaction data in the encapsulating network packet comprises means for encapsulating the transaction data in an Ethernet packet.

Example 56 includes the subject matter of any of Examples 54 and 55, and wherein the means for encapsulating the transaction data in the Ethernet packet comprises means for providing an indication in a virtual local area network (VLAN) tag of the Ethernet packet that the encapsulating Ethernet packet comprises the transaction data.

Example 57 includes the subject matter of any of Examples 54-56, and further including circuitry for receiving, by the network interface controller, a second encapsulating network packet, wherein the second encapsulating network packet encapsulates second transaction data; means for passing the second transaction data to the local accelerator device of the compute device; and means for performing, by the local accelerator device, a transaction based on the second transaction data.

Example 58 includes the subject matter of any of Examples 54-57, and wherein the second encapsulating network packet is an Ethernet packet.

Example 59 includes the subject matter of any of Examples 54-58, and further including means for analyzing a virtual local area network (VLAN) tag of the Ethernet packet, wherein the means for passing the second transaction data to the local accelerator device comprises means for passing, based on the VLAN tag of the Ethernet packet, the second transaction data to the local accelerator device.

Example 60 includes a compute device for facilitating communication between a network interface controller of a compute device and a remote accelerator device, the compute device comprising means for passing a data packet from a processor of the compute device to the network interface controller; means for encapsulating the data packet in an encapsulating network packet; circuitry for sending the encapsulating network packet to the remote accelerator device for pre-processing; circuitry for receiving, from the remote accelerator device, an encapsulating response network packet which includes a pre-processed data packet; and circuitry for sending the pre-processed data packet over a network.

Example 61 includes the subject matter of Example 60, and wherein the means for encapsulating the data packet in the encapsulating network packet comprises means for encapsulating the data packet in an Ethernet packet.

Example 62 includes the subject matter of any of Examples 60 and 61, and wherein the means for encapsulating the data packet in the Ethernet packet comprises means for providing an indication in a virtual local area network (VLAN) tag of the Ethernet packet that the encapsulating Ethernet packet comprises the data packet.

Example 63 includes the subject matter of any of Examples 60-62, and wherein the circuitry for sending the encapsulating network packet to the remote accelerator device for pre-processing comprises circuitry for sending the encapsulating network packet to the remote accelerator device for encrypting, and wherein the circuitry for receiving the encapsulating response network packet which includes the pre-processed data packet comprises circuitry for receiving the encapsulating response network packet which includes the data packet after encryption.

Example 64 includes the subject matter of any of Examples 60-63, and further including means for passing a second data packet from the processor to the network interface controller; means for passing the second data packet to a local accelerator device for pre-processing; means for pre-processing, by the local accelerator device, the second data packet; means for passing a pre-processed second data packet to the network interface controller; and circuitry for sending the pre-processed second data packet over the network.

Example 65 includes the subject matter of any of Examples 60-64, and wherein the means for pre-processing the second data packet comprises means for encrypting the second data packet.

Example 66 includes the subject matter of any of Examples 60-65, and further including means for passing, by a local accelerator device of the compute device, transaction data to the network interface controller, wherein the transaction data indicates a transaction to be performed on the remote accelerator device; means for encapsulating the transaction data in a second encapsulating network packet; and means for sending the second encapsulating network packet to the remote compute device.

Example 67 includes the subject matter of any of Examples 60-66, and further including circuitry for receiving a second encapsulating network packet, wherein the second encapsulating network packet encapsulates transaction data; means for passing, by the network interface controller, the transaction data to a local accelerator device of the compute device; and means for performing, by the local accelerator device, a transaction based on the transaction data.

The invention claimed is:

1. An apparatus comprising:
 a network interface controller comprising circuitry to:
  receive a data packet;
  encapsulate the data packet in an encapsulating network packet, wherein a payload of the encapsulating network packet includes the data packet;
  send the encapsulating network packet to an accelerator device for processing;
  receive, from the accelerator device, an encapsulating response network packet which includes a processed data packet that is based on the data packet;
  provide the processed data packet to a processor;
  receive a second encapsulating network packet, wherein the second encapsulating network packet is to encapsulate transaction data; and
  provide the transaction data to the accelerator device to perform a transaction based on the transaction data.

2. The apparatus of claim 1, wherein to encapsulate the data packet in the encapsulating network packet comprises encapsulate the data packet in an Ethernet packet.

3. The apparatus of claim 1, wherein to send the encapsulating network packet to the accelerator device for processing comprises to send the encapsulating network packet to the accelerator device for decryption and
 wherein to receive the encapsulating response network packet which includes the processed data packet comprises to receive the encapsulating response network packet which includes decrypted content of the data packet.

4. The apparatus of claim 1, wherein the network interface controller is further to:
 receive a second data packet; and
 provide the second data packet to the accelerator device for processing,
 wherein the accelerator device is to process the second data packet and provide the processed second data packet to the network interface controller, wherein the network interface controller is further to provide the processed second data packet to the processor.

5. The apparatus of claim 4, wherein to process the second data packet comprises to decrypt the second data packet.

6. The apparatus of claim 1, wherein the network interface controller is to:
provide second transaction data to the accelerator device, wherein the second transaction data indicates a transaction to be performed by the accelerator device on content of at least one packet received from the network interface controller.

7. The apparatus of claim 1, wherein the processor is to provide a second data packet to the network interface controller, and wherein the network interface controller is further to:
encapsulate the second data packet in a second encapsulating network packet;
send the second encapsulating network packet to the accelerator device for processing;
receive, from the accelerator device, a second encapsulating response network packet which includes a second processed data packet; and
send the second processed data packet over a network.

8. The apparatus of claim 1, comprising the processor.

9. The apparatus of claim 1, comprising the accelerator device.

10. A method comprising:
receiving, by a network interface controller, a data packet;
encapsulating, by the network interface controller, the data packet in an encapsulating network packet, wherein a payload of the encapsulating network packet includes the data packet;
sending, by the network interface controller, the encapsulating network packet to an accelerator device for processing;
receiving, by the network interface controller and from the accelerator device, an encapsulating response network packet which includes a version of the data packet after processing;
providing, by the network interface controller, the processed data packet to a processor;
receiving, by the network interface controller, a second encapsulating network packet, wherein the second encapsulating network packet is to encapsulate transaction data; and
providing, by the network interface controller, the transaction data to the accelerator device to perform a transaction based on the transaction data.

11. The method of claim 10, wherein encapsulating the data packet in the encapsulating network packet comprises encapsulating the data packet in an Ethernet packet.

12. The method of claim 10, wherein sending the encapsulating network packet to the accelerator device for processing comprises sending the encapsulating network packet to the accelerator device for decrypting, and
wherein receiving the encapsulating response network packet which includes the data packet after processing comprises receiving the encapsulating response network packet which includes the data packet after decryption.

13. The method of claim 10, further comprising:
receiving, by the network interface controller, a second data packet;
providing, by the network interface controller, the second data packet to a second accelerator device for processing; and
providing, by the network interface controller, processed second data packet from the second accelerator device to the processor.

14. The method of claim 13, wherein processing the second data packet comprises decrypting the second data packet.

15. The method of claim 10, further comprising:
receiving transaction data at the network interface controller, wherein the transaction data indicates a transaction to be performed on the accelerator device;
encapsulating, by the network interface controller, the transaction data in a second encapsulating network packet; and
sending, by the network interface controller, the second encapsulating network packet to the accelerator device.

16. The method of claim 10, further comprising:
receiving, from the processor, a second data packet at the network interface controller
encapsulating, by the network interface controller, the second data packet in a second encapsulating network packet;
sending, by the network interface controller, the second encapsulating network packet to the accelerator device for processing;
receiving, by the network interface controller and from the accelerator device, a second encapsulating response network packet which includes a second processed data packet; and
sending, by the network interface controller, the second processed data packet over a network.

17. A compute device comprising:
circuitry for receiving a data packet at a network interface controller;
means for encapsulating the data packet in an encapsulating network packet, wherein a payload of the encapsulating network packet includes the received data packet;
circuitry for sending the encapsulating network packet to an accelerator device for processing;
circuitry for receiving, from the accelerator device, an encapsulating response network packet which includes the data packet after processing;
means for providing the processed data packet to a processor of the compute device;
means for receiving a second encapsulating network packet, wherein the second encapsulating network packet is to encapsulate transaction data; and
means for providing the transaction data to the accelerator device to perform a transaction based on the transaction data.

18. The compute device of claim 17, wherein the circuitry for sending the encapsulating network packet to the accelerator device for processing comprises circuitry for sending the encapsulating network packet to the accelerator device for decrypting, and
wherein the circuitry for receiving the encapsulating response network packet which includes the data packet after processing comprises circuitry for receiving the encapsulating response network packet which includes the data packet after decryption.

19. The compute device of claim 17, further comprising:
a second accelerator device;
means for receiving, by the network interface controller, a second data packet;
means for providing, by the network interface controller, the second data packet to the second accelerator device for processing; and means for providing, by the network interface controller, the second data packet processed by the second accelerator device to the processor of the compute device.

20. The compute device of claim 17, further comprising:
means for receiving a second data packet, from the processor, at the network interface controller;
means for encapsulating, by the network interface controller, the second data packet in a second encapsulating network packet;
means for sending, by the network interface controller, the second encapsulating network packet to the accelerator device for processing;
means for receiving, by the network interface controller and from the accelerator device, a second encapsulating response network packet which includes a second processed data packet; and
means for sending, by the network interface controller, the second processed data packet over a network.

21. An apparatus comprising:
a network interface controller and
circuitry to provide transaction data to the network interface controller, wherein the transaction data is to indicate a transaction to be performed on an accelerator device and wherein the network interface controller is to:
encapsulate the transaction data in an encapsulating network packet;
send the encapsulating network packet to the accelerator device;
receive a second encapsulating network packet, wherein the second encapsulating network packet is to encapsulate second transaction data; and
provide the second transaction data to the accelerator device, wherein the accelerator device is further to perform a transaction based on the second transaction data.

22. The apparatus of claim 21, wherein to encapsulate the transaction data in the encapsulating network packet comprises to encapsulate the transaction data in an Ethernet packet.

23. The apparatus of claim 21, wherein the second encapsulating network packet comprises an Ethernet packet.

24. An apparatus comprising:
a network interface controller comprising an interface and circuitry, the circuitry to:
provide a processed data packet to a processor, wherein the network interface controller is to receive the processed data packet in at least one packet and the processed data packet was processed by an accelerator device based on a request from the network interface controller sent in a first encapsulating network packet;
receive a second encapsulating network packet, wherein the second encapsulating network packet is to encapsulate transaction data; and
provide the transaction data to the accelerator device to perform a transaction based on the transaction data.

25. The apparatus of claim 24, wherein, prior to receipt of the processed data packet: the network interface controller is to provide the data packet, received by the network interface controller, to the accelerator device in a payload of at least one packet to process the data packet.

26. The apparatus of claim 24, wherein the network interface controller is to configure the accelerator device to process the data packet.

27. The apparatus of claim 24, comprising the processor coupled to the network interface controller by the interface.

* * * * *